INVENTOR.
Martin E. Evans
BY

July 5, 1960 M. E. EVANS 2,944,109

COMBINED SOUND AND COLOR MOTION PICTURE AND TELEVISION RECORDING APPARATUS

Filed Dec. 7, 1953 17 Sheets-Sheet 2

INVENTOR.

Martin E. Evans

July 5, 1960 M. E. EVANS 2,944,109

COMBINED SOUND AND COLOR MOTION PICTURE AND TELEVISION RECORDING APPARATUS

Filed Dec. 7, 1953 17 Sheets-Sheet 3

INVENTOR.

Martin E. Evans

July 5, 1960 M. E. EVANS 2,944,109

COMBINED SOUND AND COLOR MOTION PICTURE AND TELEVISION RECORDING APPARATUS

Filed Dec. 7, 1953 17 Sheets-Sheet 4

INVENTOR.

Martin E. Evans

INVENTOR.
Martin E. Evans

INVENTOR.
Martin E. Evans

July 5, 1960 M. E. EVANS 2,944,109

COMBINED SOUND AND COLOR MOTION PICTURE AND TELEVISION RECORDING APPARATUS

Filed Dec. 7, 1953 17 Sheets-Sheet 7

INVENTOR.

Martin E. Evans

July 5, 1960 M. E. EVANS 2,944,109

COMBINED SOUND AND COLOR MOTION PICTURE AND TELEVISION RECORDING APPARATUS

Filed Dec. 7, 1953 17 Sheets-Sheet 8

INVENTOR.

Martin E. Evans

INVENTOR.
Martin E. Evans

INVENTOR.
Martin E. Evans

INVENTOR.

Martin E. Evans

July 5, 1960 M. E. EVANS 2,944,109

COMBINED SOUND AND COLOR MOTION PICTURE AND TELEVISION RECORDING APPARATUS

Filed Dec. 7, 1953 17 Sheets-Sheet 12

INVENTOR.
Martin E. Evans

INVENTOR.
Martin E. Evans

INVENTOR.
Martin E. Evans

INVENTOR.
Martin E. Evans

INVENTOR.
Martin E. Evans

INVENTOR.
Martin E. Evans 2,944,109

COMBINED SOUND AND COLOR MOTION PICTURE AND TELEVISION RECORDING APPARATUS

Martin E. Evans, 205 6th Ave., Brooklyn 17, N.Y.

Filed Dec. 7, 1953, Ser. No. 398,111

16 Claims. (Cl. 178—7.4)

This invention relates to motion picture photography and more particularly to apparatus applicable to multiple usage in the field of recording, projecting and printing of motion pictures with sound and color.

It is an object of this invention to remove the limitations imposed upon motion picture photography by the limitations of the individual elements in a motion picture machine, by the assembled arrangement of those elements, and by the carrier of the photographic emulsion utilizing those elements.

Among the further objects of this invention are accessibility, particularly of the shutter, an increase in range of shutter action; provision for automatic phasing of the shutter; provision for multiple color filters to selectively analyze light into primary colors by individual colors and by collective primary color scanning; provision for phasing of color filters with respect to the film; provision for automatically identifying the analyzed colors on exposed and developed emulsion; provision for recording on the emulsion carrier sound at the scene photographed with monitoring sound play back; provision for combining magnetic and other recording means such as photographic and stylus to utilize space between magnetic tracks normally lost on account of separation to avoid magnetic cross talk; provision for transporting the film in the camera and automatic threading of the camera, including transporting the film out of and back into the camera between the pull down mechanism and the combination propelling and sound recording sprocket; provision for photography at new low light levels by use of an intermediately placed Orthicon electronic tube; provision for generating electrical pulses by mechanical or relative movement of the generating means; provision for magnetically recording the pulses on mechanically moving means; provision for comparing the relative positions of the recordings on the record; provision for feeding magnetic control tape through the mechanism to influence the mechanism's operation; provision for recording sound on the film selectively before recording images or after recording images or both before and after; provision for using the apparatus for photography, projection, printing, stereoscopically, stereophonically and anamorphoscopically.

It is a further objective of this invention to provide photographic apparatus basically adapted to use in diverse fields.

Motion picture machines are operated in diverse fields and with varied lighting conditions such as motion picture studios, news reel recording, scientific investigation, stroboscopic engineering investigation, television screen photography and color photography. The usual motion picture machine and machines designed for special fields such as television screen photography have not been readily usable in other fields heretofore. They have lacked (1) flexibility in manipulating the shutter; (2) flexibility in transporting and manipulating the film in the machine: (3) flexibility in phasing the electric drive with the film pull down; (4) flexibility in primary color recording; (5) flexibility in identifying the color with the film frame; (6) flexibility in sound recording and reproduction; (7) flexibility in operation for either recording, projection or printing; (8) flexibility in the type of emulsion carrier; (9) flexibility in exposure light control; and they have wholly lacked facilities for feeding a control tape through the mechanism, particularly during image and sound recording. To provide any one of these features is an addition to the art. To provide them collectivelly, making them available simultaneously in a single machine is a further addition to the art, providing new, basic and pioneer photographic apparatus. The methods of photography using this apparatus are new and basic.

Further objects of the invention and novel features will be apparent from the following specification when considered with the accompanying drawing.

Because of the present state of flux in the color television art, there being six systems now before the public, a great degree of flexibility is required in a film recording apparatus to meet recording requirements of these varied systems. Only one of these may ultimately serve as a basis for public service. In the interval awaiting selection of the one system, a film recording apparatus must provide for cooperative action with them all. To this end the motion picture camera is provided with operating control elements permitting changes therein to function with a multitude of systems should they develop.

To this end, rotating, reciprocating and belt line motion elements of the camera are provided with a thin layer of magnetizable material on a suitable non magnetizable backing such as paper, aluminum, non magnetizable stainless steel, etc. This magnetizable material, preferably finely divided magnetic oxides of iron suspended in a plastic lacquer, may be applied to the associated elements with an artist's air brush. Recording and play back pole pieces mounted on stationary elements in close proximity to the movable surface coating not only provide a means for recording on and reproducing from the magnetic medium but assist in the selection of stored signals from the record.

Preferably, the pole pieces consist of split Mumetal cores, each half being composed of 12 laminations 0.006 inch thick, cemented together and stacked to a total thickness of approximately 0.10 inch. The cores are wound with either one 250-turn coil or two 300-turn coils as required by the playback and recording pole pieces, respectively. The active tips of the two halves of the core are carefully lapped and polished. The air gap thus formed supplies the leakage field by which sharp current pulses in the coils may be recorded as short dipoles in the moving magnetic medium as it passes under the pole piece tips. In order to insure a high degree of reliability in operation, only ten pulses are recorded per inch of circumference on the surface of very fast moving surfaces.

The pole pieces are mounted in machined brass or molded plastic housings, according as magnetic shielding is or is not necessary due to the close proximity of recording and playback units. Since the housings are approximately ½ inch thick, they are mounted on stepped spiral brackets measured radially of a rotating disk having lands separated by ⅛ inch measured radially where the magnetic material is in disk form. This construction permits economical use of the magnetic material and provides 0.125 inch between recording channels to prevent cross talk.

The two coils of a record pole piece are wound in opposition with a common ground between them. A sharp current pulse applied to one of the coil input terminals causes a positive or negative magnetic dipole to be recorded in the magnetic medium, depending on the direction of the current. In either case, a dipole recorded by the other coil will be of the opposite polarity for the same direction of current flow. A recorded dipole, in passing under a play back pole piece will generate an electromotive force at the output terminal of its coil. The resulting pulse forms a positive peak followed by a negative peak, Fig. 11, or a negative peak followed by a positive peak, Fig. 11.

Signals coming from a play back pole piece are delivered to a play back unit where they are amplified and converted into a rectangular envelope. For example, Fig. 11 shows a series of dipole record combinations, (*a*) at the terminal of the play back coil, and (*b*) at the output of the play back unit. If played back information is to be re-recorded, the output of the play back unit is delivered to a record unit which gates or modulates a set of standard record pulses, and delivers them to the two coils of a record pole piece, as shown in Fig. 11.

The magnetic disk, belt, and drum storage has the pleasing characteristic that information once recorded remains on the recording surface indefinitely unless deliberately altered. Moreover, provided that accurately timed record pulses are used, it is not necessary to erase the surface by demagnetizing it, in order to change from one dipole record to the other. This is because the record current is sufficient to saturate the medium in either direction, with the result that the recorded dipoles either remain unchanged or suffer a complete reversal of polarity, when subjected to a record pulse of like or opposite sign respectively. Thus it becomes possible to record a succession of quantities in a given channel with complete assurance that the last information delivered to the storage drum, disk or belt will be stored there independent of any previously recorded quantities.

The accurately stored pulses required in the operation of the record and play back units are themselves obtained from storage disk, drum or belt where channels of evenly spaced dipoles have been permanently recorded.

From another aspect this invention contemplates the conversion of the light image on a television screen from the aspect ratio of the screen to an aspect ratio suited to providing the effect when projected from the recording film of (1) three dimension viewing, or (2) stereoscopic viewing, or (3) a combination of these effects. The projected aspect ratio is preferably within 1:2½.

The first effect may be obtained (*a*) by the use of a so-called anamorphoscopic process, using a lens to compress in the end portions of the image when recording and another lens to expand the compressed parts when projected, (*b*) by an image rotating lens system for elongating the image along the length of the film so that, for example, on 35 mm. film, the usual length of the image across the film is turned lengthwise of the film to occupy two frame spaces. The second effect may be obtained by an optical system providing a pair of separated side by side images from the screen on the film, the film images being side by side either vertically or horizontally of the film. If the images are in the noted horizontal position, phasing only is required during projection; if they are in the vertical position, they may be transferred to horizontal sized pictures by certain image erecting aggregations well known to the art.

The third noted combination may be obtained by using an optical device for picture phasing, diffracting wedge and polarizators.

Operations are contemplated with the film running either horizontally or vertically. A camera head is provided containing all the devices for interchangeable use. The camera and magazine may be rotated clockwise 90° giving access to film chamber of case and magazines from the top in place of the side.

This application is a continuation in part of application Serial No. 120,563, filed October 10, 1949, and now becoming Patent No. 2,661,652, subject Motion Picture Apparatus and Method.

Figures 30, 31, 32, 33, 34:
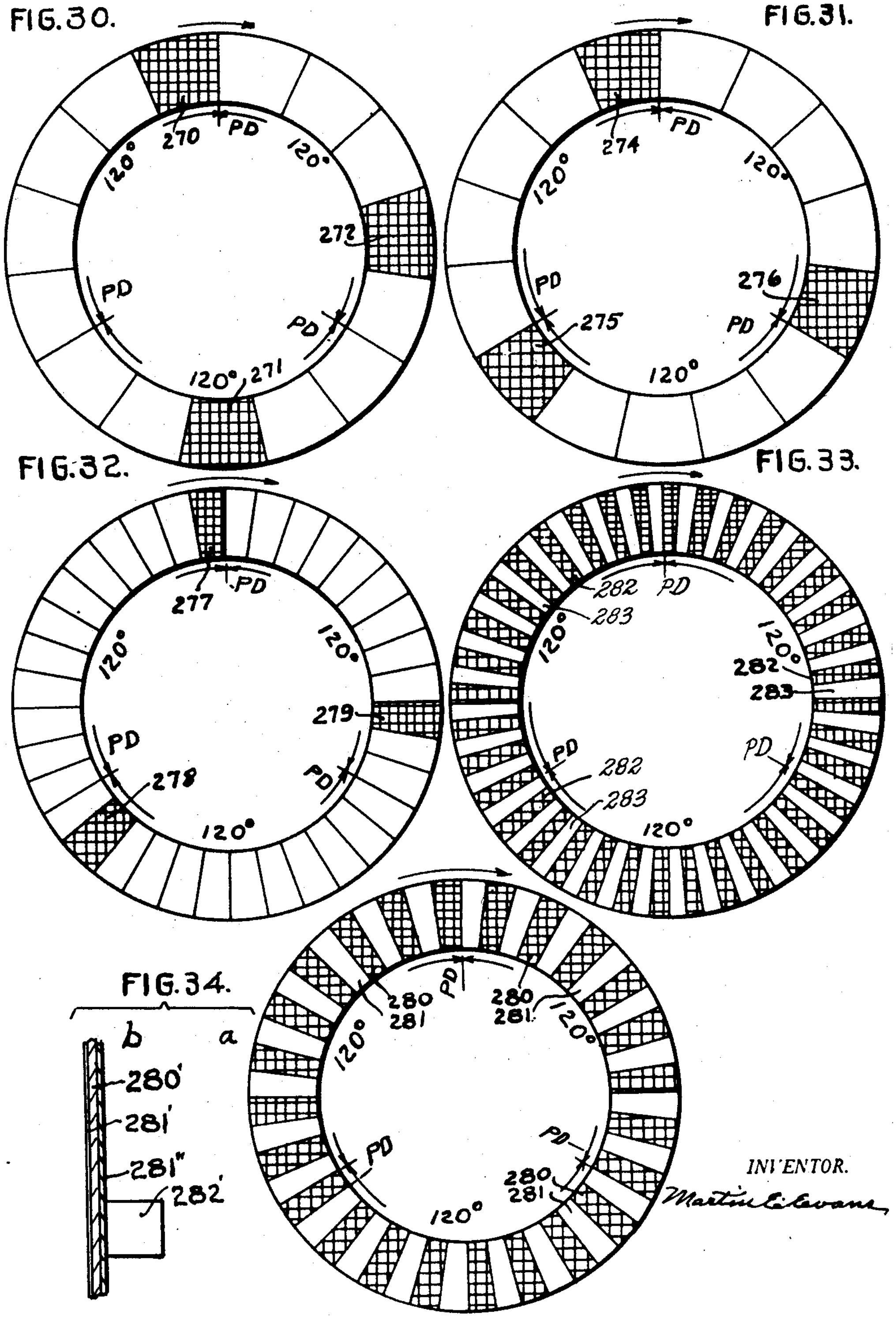

Fig. 30 is a back view of a light control chart for recording photographically 30 frame televised 3 color values occurring in varied sequence for 6 frame camera action.

Fig. 31 is a back view of a light control chart for 3 color values occurring in regular sequence for varied camera frame rates.

Fig. 32 is a back view of a light control chart for recording photographically 72 frame rate televised 3 color values at 6 frame rate camera action.

Fig. 33 is a light control chart for standard pictures at 6 frames per second taken by a flash light operating 72 times per second.

Fig. 34 is a light control chart for projecting pictures from a film moved 6 frames per second in the camera.

Figures 35, 36, 37:
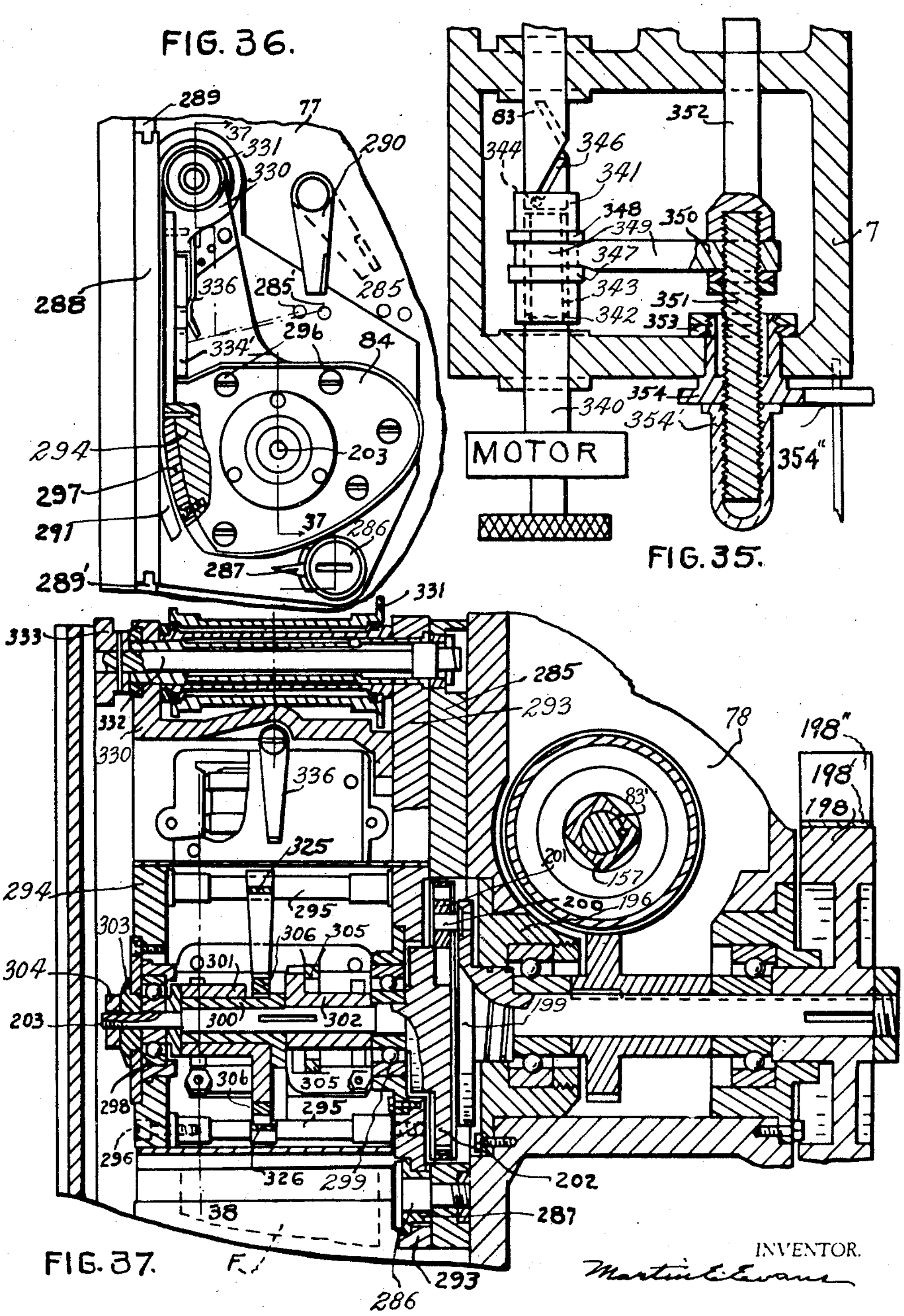

Fig. 35 is a horizontal sectional view of a phasing device between the motor and camera drive shaft.

Fig. 36 is a side view of a modified removable pull down mechanism originally shown in U.S. Pat. 2,144,277.

Fig. 37 is a vertical sectional view of the pull down mechanism along line 37—37 of Fig. 36.

Figures 38, 39, 41:
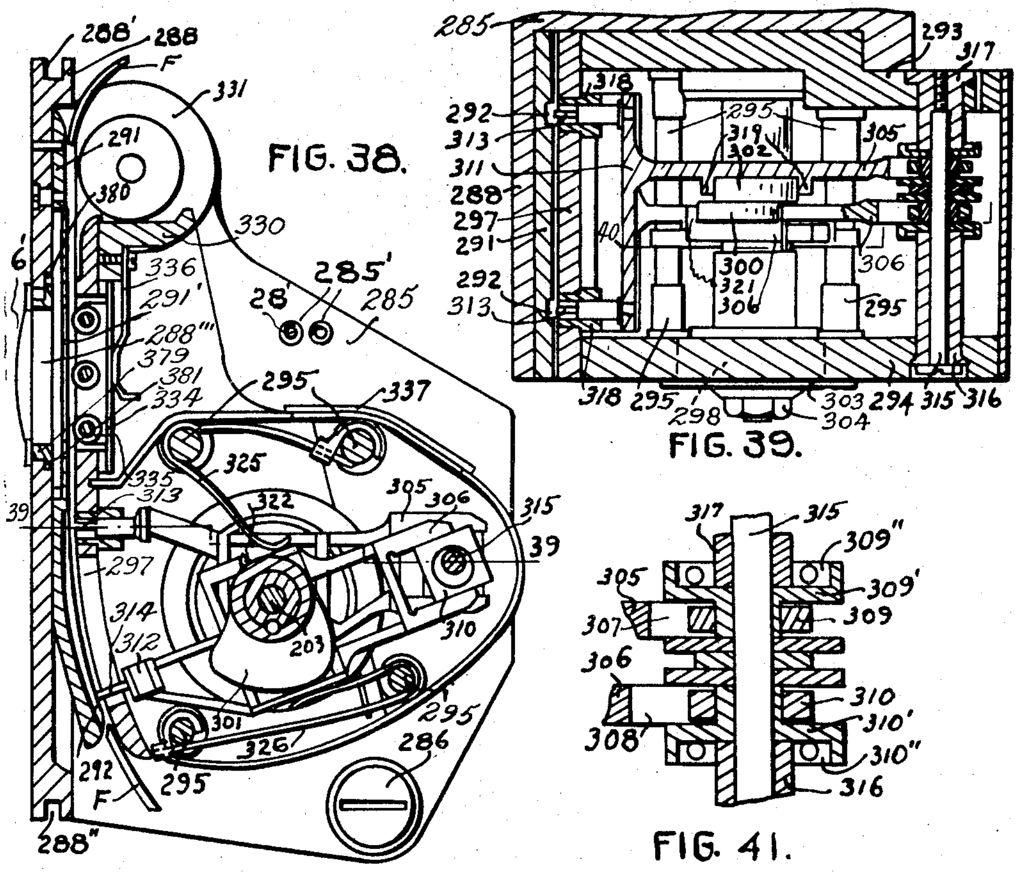

Fig. 38 is a vertical sectional view of the pull down mechanism along the line 38—38 of Fig. 37.

Fig. 39 is a horizontal sectional view of the pull down mechanism along the line 39—39 of Fig. 38.

Figure 40:
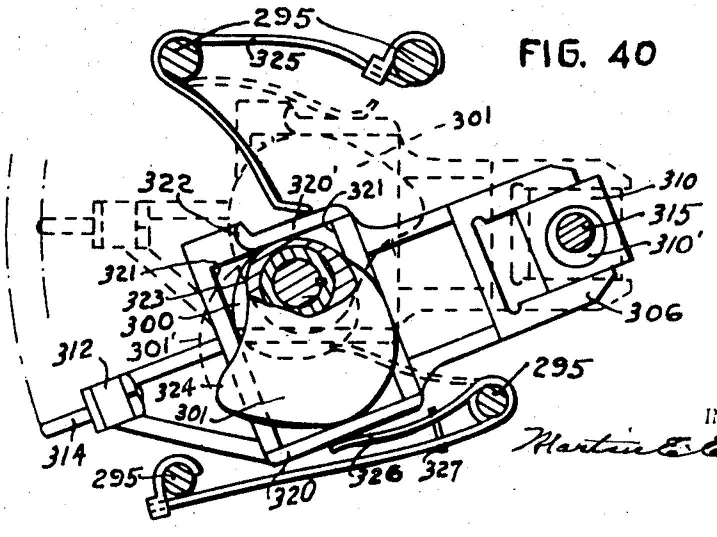

Fig. 40 is an enlarged partial sectional view through the pull down mechanism along the line 40—40 of Fig. 39.

Fig. 41 is an enlarged portion of Fig. 39.

Figures 42, 43, 44, 45, 46, 47, 53:
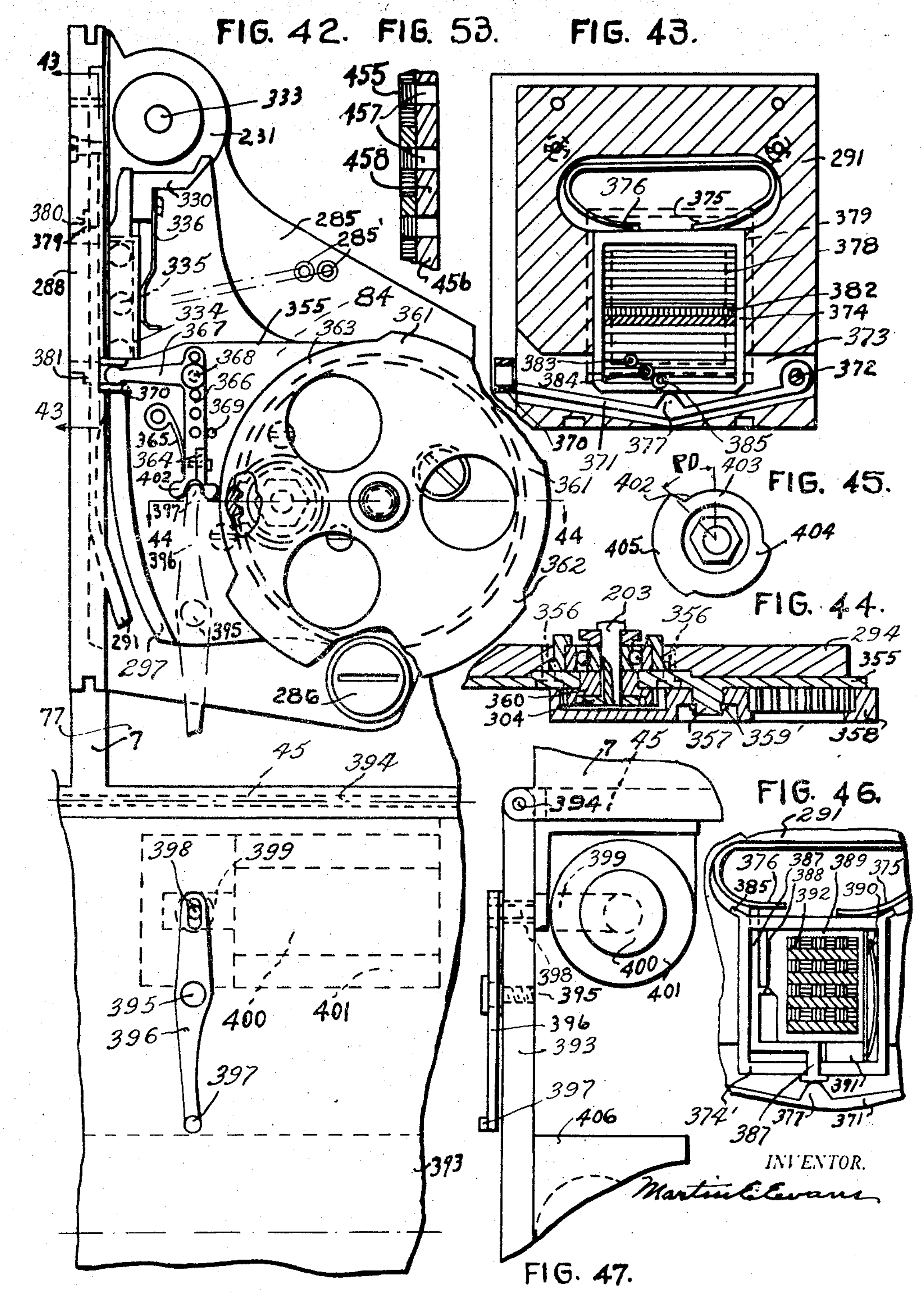

Fig. 42 is a view in vertical elevation of the pull down mechanism fitted with a color screen and its operating accessories.

Fig. 43 is a vertical sectional view of Fig. 42 along line 43—43 showing the color screen installation.

Fig. 44 is a horizontal sectional view along the line 44—44 of Fig. 42 showing the drive connection for the color screen.

Fig. 45 is a front view of a screen driving cam.

Fig. 46 is another form of color screen with its mounting.

Fig. 47 is an end view of the camera door swung downwardly showing the drive arm for the color screen operative from outside the camera.

Figures 1, 2:
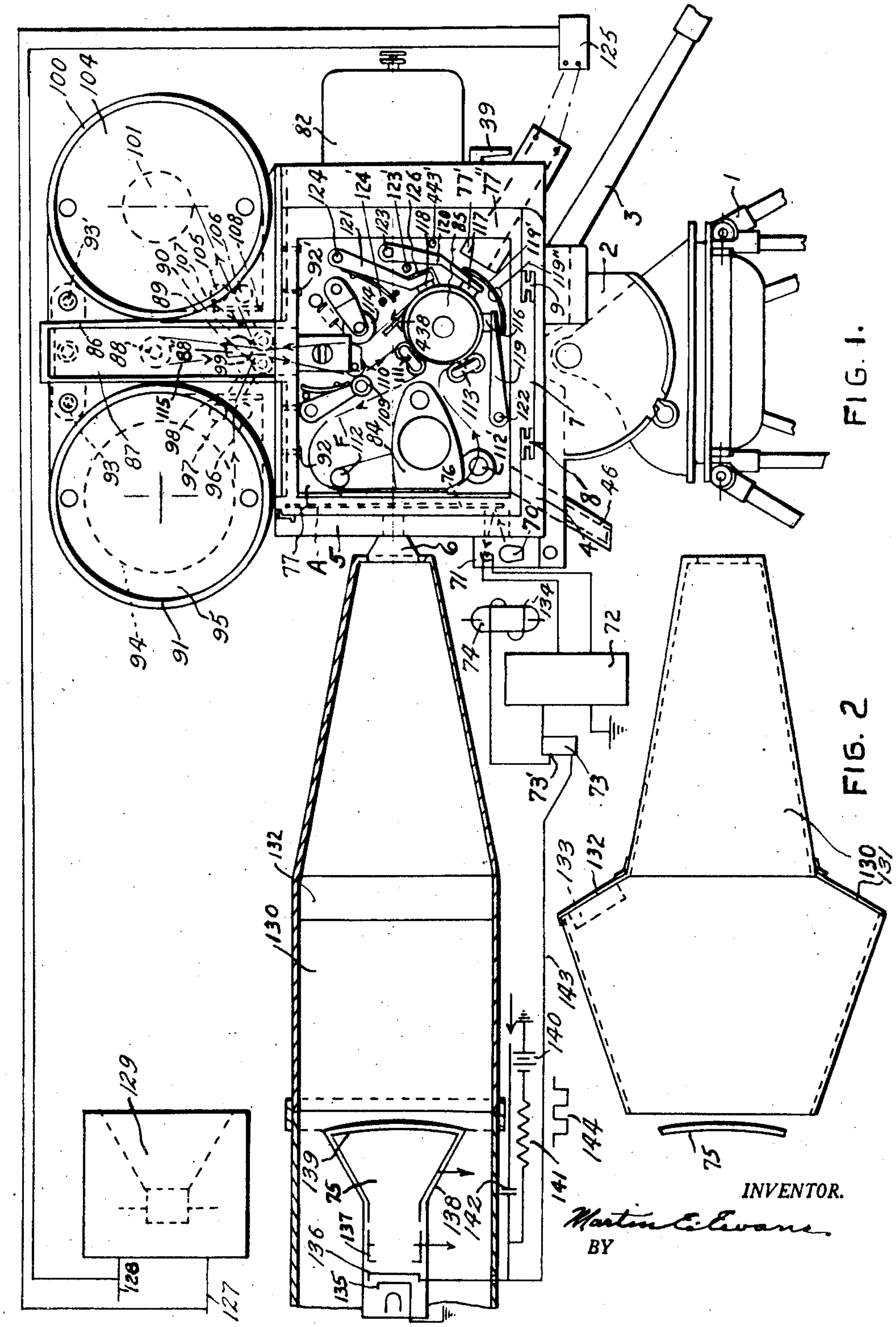
Fig. 1 is a front side view of a motion picture camera mounted on a tripod before a television receiver.
Fig. 2 is a plan view of a dark tunnel isolating extraneous light from that passing from the television receiver tube to the camera of Fig. 1.
Figures 48, 49, 50:
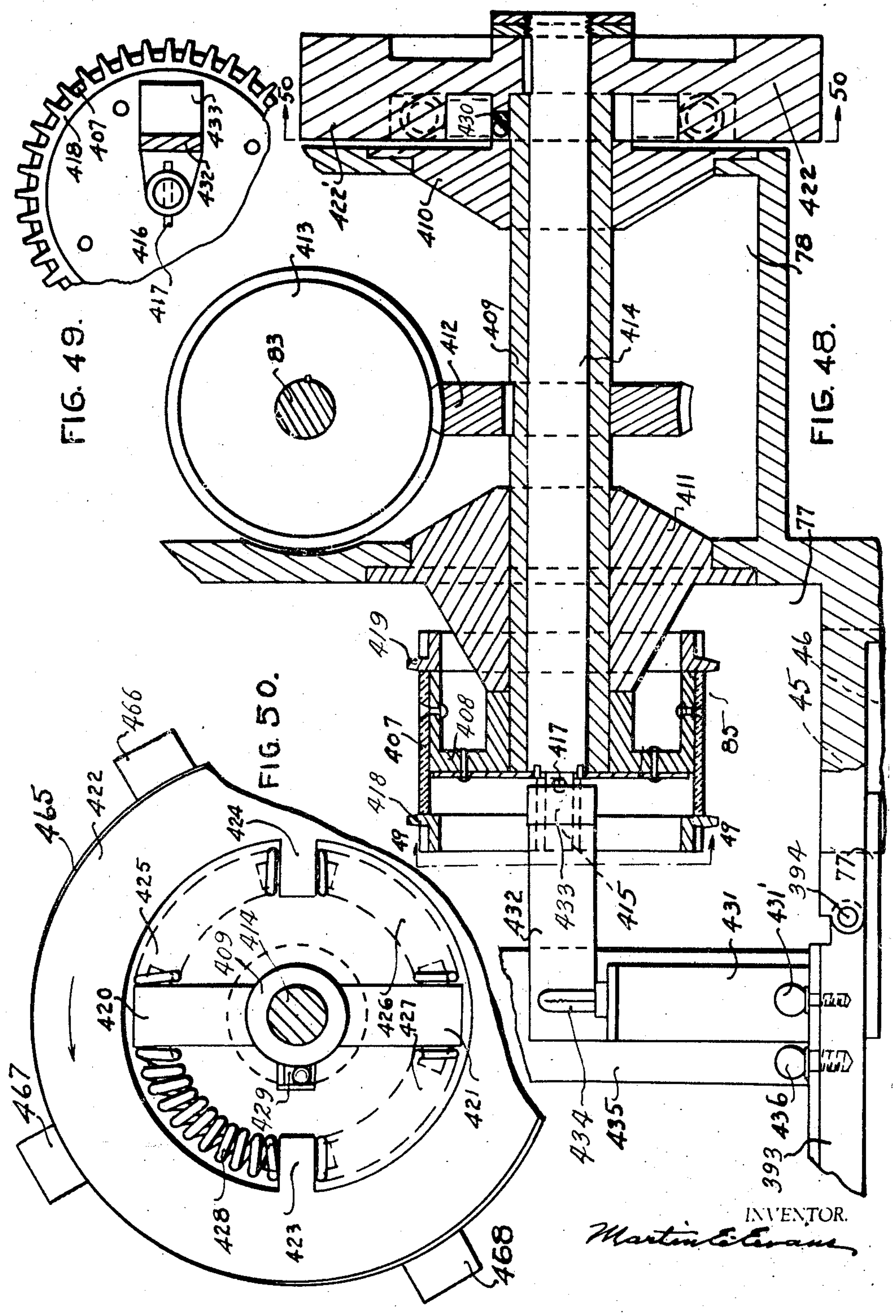

Fig. 48 is a vertical sectional view through the drive shaft for film movement as shown in Fig. 1.

Fig. 49 is a vertical partial sectional view along the line 49—49 of Fig. 48.

Fig. 50 is a vertical partial sectional view along line 50—50 of Fig. 48.

Figures 51, 52:
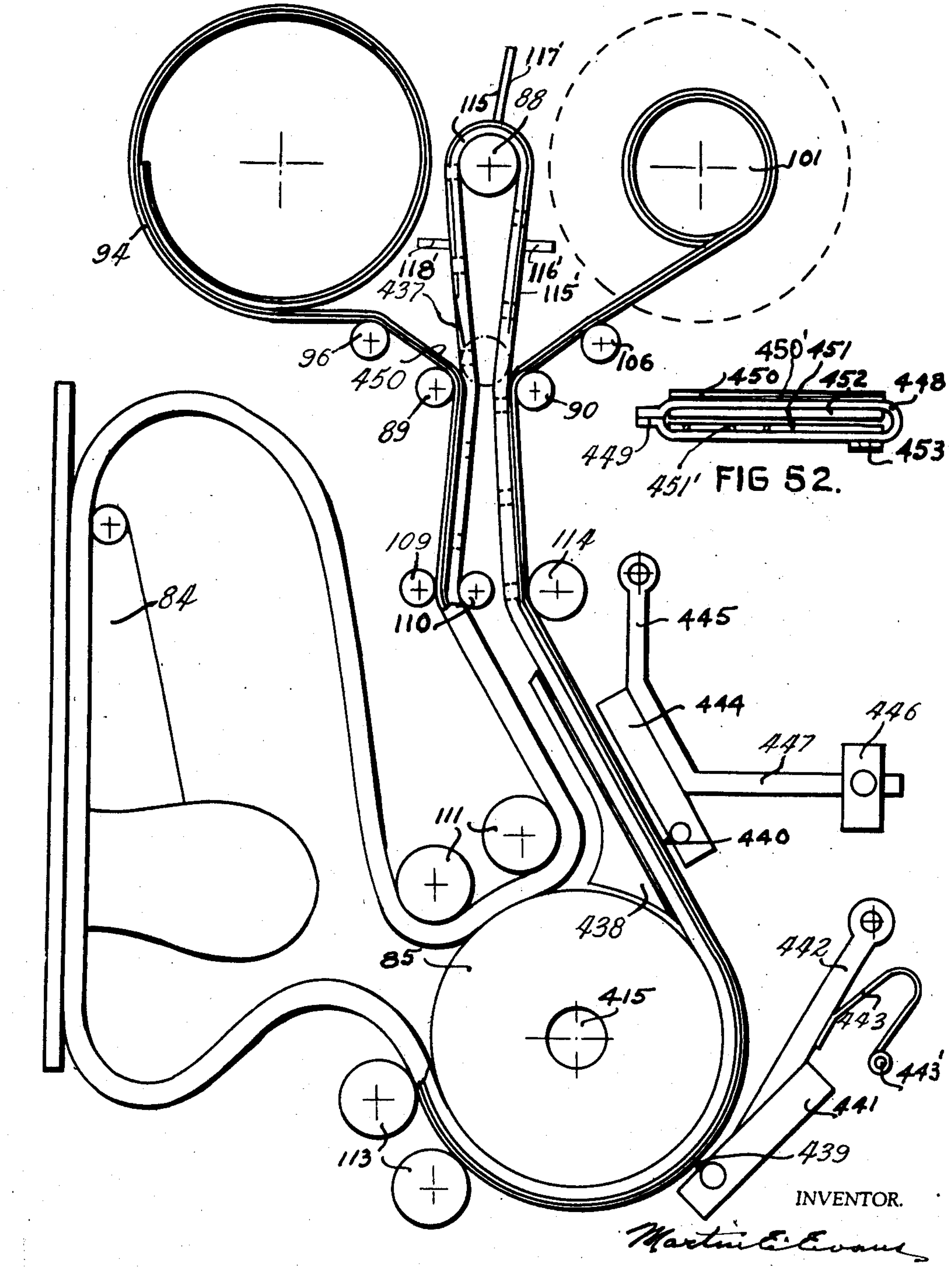

Fig. 51 is a diagrammatic representation of the film conveyor band and sound recorder.

Fig. 52 is an end view of the novel photographic element carried by the band.

Fig. 53 is a cross sectional view through a film and a blanking screen for color.

Figure 4:
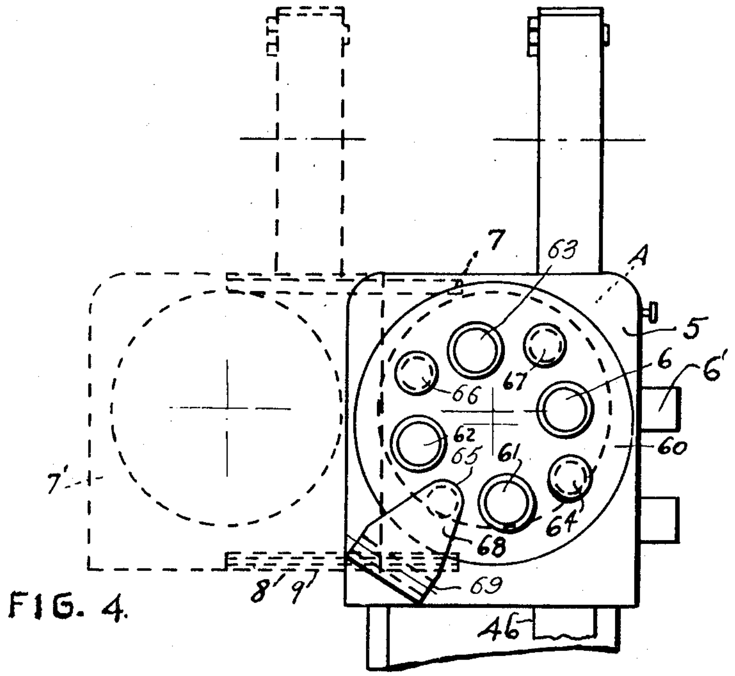
Fig. 4 is a front view of the camera of Fig. 1, showing the camera body shifted to one side to give access to a shutter chamber.

Referring to Fig. 1, on a tripod 1 is mounted a pivoted head 2 with an adjusting handle 3. The head 2 carries a camera base 4 with a front upstanding member 5 on which is mounted lens 6. On the camera base 4 rests camera case 7 with grooved beams 8 and 9 between them holding the case and base in sidewise alignment by tongues from the members 4 and 7 fitting the grooves of 8 and 9. The degree of sidewise movement is shown in Fig. 4, where the outline 7' of the camera case 7 rests upon the beams 8 and 9 which are approximately half way extended from the base 4.

The travel of the beams 8 and 9 is limited by beam pins 10 and 11 which are upstanding in grooves 12 and 13 respectively in the camera case 7 and depending in grooves 14 and 15 in the camera base 4. Complete details of a suitable shifting mechanism appear in the parent Patent 2,661,652.

Figure 5:
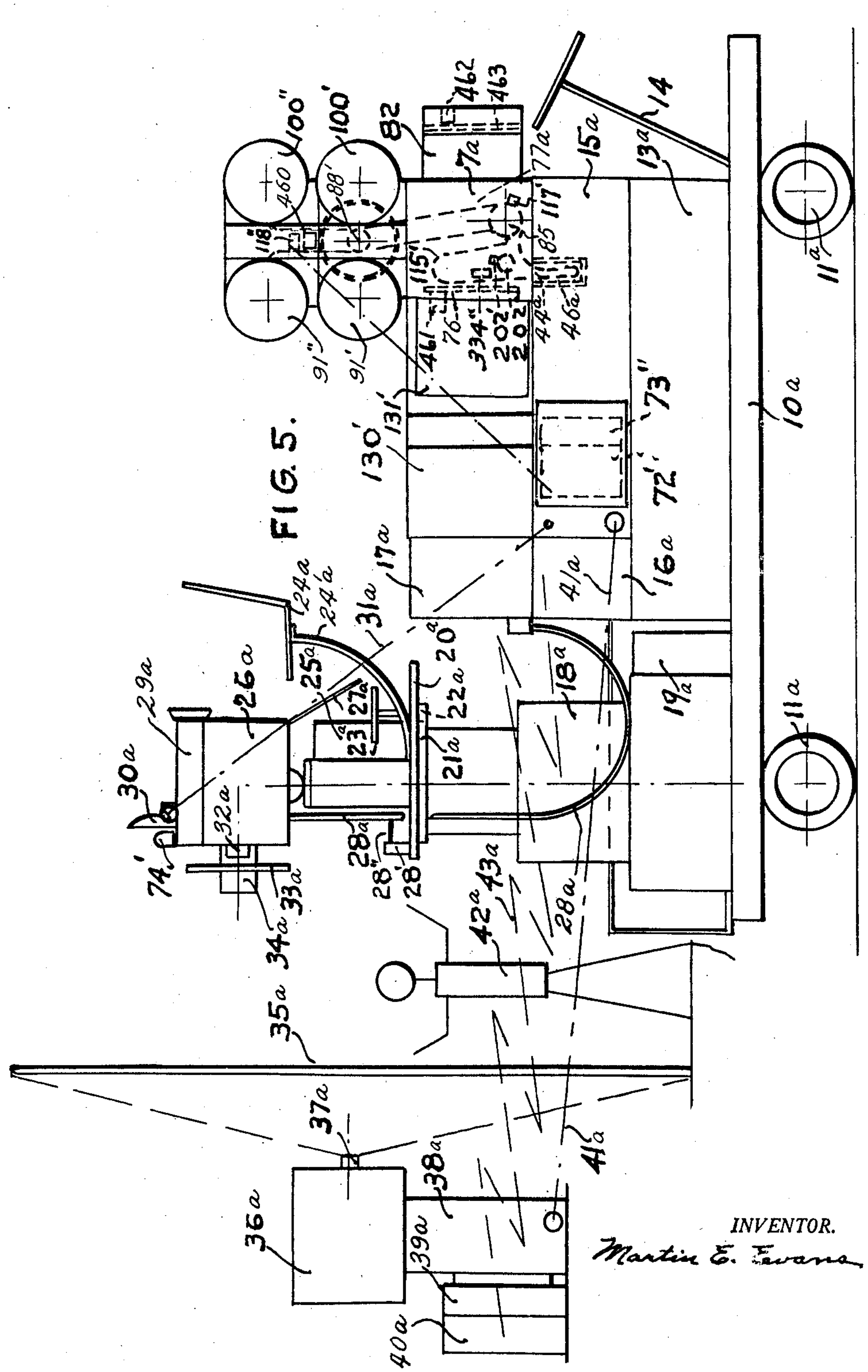
Fig. 5 shows an embodiment of the invention interposing a television camera between a recording camera and a translucent screen having back projection controlled by the recording camera, the television and recording cameras being on a common mobile mount.

Referring to Fig. 5, on a chassis **10*a* mounted on wheels 11*a* propelled by means not shown, is a storage battery 13*a* for furnishing power on occasion. Connections not shown are also provided for drawing power from power mains when these do not interfere with the mobility of the chassis and the operations of the devices thereon. Over the storage battery at the rear of the chassis is a cabinet 15*a* with side openings therein giving access to amplifier 72' and switching means 73''. The chassis carries radio sending station 16*a* and a television receiver 17*a*, this latter facing the objective of camera case 7*a*, the latter being supported above the cabinet 15*a*. The chassis 10*a* carries a telescopic support 18*a* and hydraulic operating mechanism 19*a* therefor. The telescopic support carries a platform 20*a*, an enclosed gear 21*a* and pinion 22*a* operated by hand wheel 23*a* for rotation of the platform. A spring 24*a'* supports seat 24*a* for an operator within reach of the operating panel 25*a* on the platform. On top of the support 18*a* television camera 26*a* is tiltably mounted for movement by handle 27*a*. A cable connection 28*a* links the camera 26*a* to the television receiver 17*a*. The television camera 26*a* supports view finder 29*a*. The finder supports lamp 74' and reflector 30*a*. Cable 31*a* connects the lamp to power supply and control means, later described, through the switching means 73''. Movement of the television camera by handle 27*a* automatically moves the beam from the lamp 74' into the field of focus of the television camera 26*a*. The camera 26*a* carries objective 32*a*, rotating color screen 33*a* operated by a motor not shown, and objective 34*a*. The objective 32*a* is exchangeable as required for the proper recording of the scene at hand. The filter 33*a* and objective 34*a* are arranged to permit this exchange. The objective 34*a*** may be exchangeable to fall within the class for a variety of purposes, such as (1) providing stereoscopic arrangement on the television raster, (2) anamorphoscopic process for (*a*) squeezing portions of the scene laterally in the image, (*b*) rotating the image from vertical to horizontal, etc.

In the field of view of the elevated television camera **26*a* is translucent screen 35*a* having back projector or projectors 36*a* with objective or objectives 37*a* with suitable light source and shutter and supply and take-up reels, not shown. The projector 36*a* is supported on base 38*a* having therein control mechanism, not shown, to which mechanism 39*a* provides operating instructions and actuation in accordance with instructions provided thereto by radio receiver 40*a*. Instructions for operation and the operation of the projecting mechanism are dually provided by cable 41*a* from the switch 73'' in cabinet 15*a* and by the aerial radio transmission from transmitter 16*a* to receiver 40*a*. The latter is particularly desirable when the movements of the chassis 10*a* are too rapid to follow the action of a figure 42*a* before the screen and the cable 41*a* interfers with the operation. The zig-zag line 43*a* shows the communication by radio between sending station 16*a* and receiving station 40*a***.

As shown in Fig. 5, the various units of the system are arranged for operating management from a common operating panel **25*a* by an operator on seat 24*a* who, having adjusted directing film in magazine 91'' through its operating path, adjusted recording film in magazine 91' through its operating path, focused the recording camera objective on the television screen 139 or its counterparts, and arranged operative control between projector 36*a* and the recording camera, may manipulate camera 26*a*** and the panel controls, not shown, for the units.

An anamorphic lens on camera **26*a* by selection may include an aspect ratio of 2.55 to 1 providing an image showing on the screen 139 or its counterpart a panoramic image compressed horizontally to a lesser aspect such as 1.33 to 1 which is common for motion picture projection. This image is further characterized by having (1) a background appearing before the lens intermittently under control of the recording camera 7*a*** and (2) a foreground of action blanking out portions of the background when it appears.

The electronic camera **26*a* in the manner well known to the art in combination with the electronic chain therewith translates the scene before the camera objective piecemeal to the screen. Time intervals are involved such that the background showing interval on screen 35*a* bears a definite relation to translation interval to screen 139 and its counterpart. Thus a timed relation is required to be maintained between the lighting of the background screen 35a and the transmission of that image by camera 26a. If the screen 35a is dark when the image of member 42a and of other action before the screen is translated by the camera 26a and its electronic chain, the picture to be recorded by camera 7a will be incomplete. There is a pull down interval required for the background film, as mentioned elsewhere, blanking the screen 35a. This invention provides an operating connection between the recording camera 7a and projector 36a, (1) physical when the members are near enough together to accommodate same, and electronic when the members mentioned are too far apart for such physical arrangement. Such a connection provides automatic synchronization of the background with the foreground and relieves operator on seat 26a of a detail to follow and permits him to give more attention to finder 29a**.

Ordinarily objective 32a provides the usual aspect ratio of 1.33 to 1 with images of member 42a of a definite height. With the anamorphic elements therewith objective 32a provides the aspect ratio say up to 2.55 to 1 approximately with the increase in the horizontal dimension and height of member 42a remaining as before. Because of the inclusion of the greater horizontal subject matter the eye gives the beholder a greater sense of reality. Also, it is seen that the anamorphic elements when used upon the film camera objective for effective use prefer an aspect ratio of the electronic screen beyond 1.33 to 1 to avoid discarding part of the vertical dimension in the film record.

With the film camera 7a operatively adjusted in connection with projector 36a, the appearance of the background images on screen 35a is automatically synchronized to the operating requirements of camera 26a which also operates intermittently. Their rated occurrence and period of duration may be governed by use of the various features later detailed for pull down mechanism, shutter mechanism, electronic controls and projection operation of the recording camera. It is of course, understood that the camera 26a may be of the character adapted to color television.

The camera case 7a has an aperture 44a with closure therefor, in the bottom of film handling chamber 77a, Fig. 5. Referring also to Figs. 3, 42, 47, 48 and 51, through the aperture 44 film is fed downwardly into chamber 46 by the pull down mechanism 84. Chamber 46 is deep enough to receive the loop of the longest length of film required to operate between pull down 84 and film sprocket 85 for sound recording on sprocket 85. The closure 45 is used when the length of film between pull down 84 and sprocket 85 can be accommodated within chamber 77. It is readily accessible for manual manipulation when the large closure 393 to chamber 77 is opened downwardly. The belt 115 in contact with upper support 88 extends tautly downwardly to drive sprocket 85 and thence loosely through the intermittent mechanism 84, into chamber 46 and back to sprocket 85. A flap 437 is formed and positioned on the belt to receive a film leader and lead same in the film operating path through the chambers 77 and 46. In the chamber 46, the belt holds the film from buckling under the operating push by the pull down mechanism and forces it to remain in the chamber 46 during the reversing operation therein.

The objective of case 7a faces a cathode ray screen of receiver 17a and the interval therebetween is enclosed by a tunnel 130' similar to 130 shown in Fig. 2.

A door 131' in the tunnel 130' gives access to the objective therein. In magazine 91'' is provided a tape having magnetic dipoles recorded thereon, in a plurality of lands if so desired. The tape is withdrawn past a coil or coils 118'' by sprocket 85 and returned therefrom to take up magazine 100''. In its passage past member 118'', a pulse or pulses are generated in the latter and passed on to the amplifier or amplifiers in the amplifier aggregation 72' from whence the pulse or pulses are distributed through the switching aggregation 73 to the operating members to be controlled thereby. Successive pulses may pass along route not shown to blank the cathode of the receiver 17a or when the tape is associated with the set up shown in Fig. 1 to blank the cathode 75 at suitable intervals for film recording.

As representative of the available precision speed control applicable between the wild shooting camera on chassis 10a and the back projector 36a, reference is made to "Precision Speed Control, Journal of the Society of Motion Picture Engineers, May 1949, pages 562 and 568," showing schematic circuits, motor and control circuit. By this and similar devices, control between the motors on the above members would not vary over 1.28 frames in 16,000. This precision is particularly pleasing for television recording.

The sound recording mechanisms presented with Fig. 1 are applicable to this portable installation, though not shown. Microphones being substituted for loudspeaker circuit connection. Loudspeaker not shown is operable by tape from magazine 91'' through connections through amplifiers 72'. A microphone 28' through lead 28'' of cable 28a may serve sound circuits to receiver 17a.

For extending the aspect ratio of the standard camera, amateur and professional, it is proposed to change the aperture area before the film to as much as a ratio 1:2½, the long way longitudinally of the film, increase the covering power of the objective to the required degree, mount the camera case to operate the film horizontally and provide shifting means to shift the eye objective mount to bring the exposure objective and the eye focusing objective, into alignment, the film magazine lying on its side.

Figure 3:
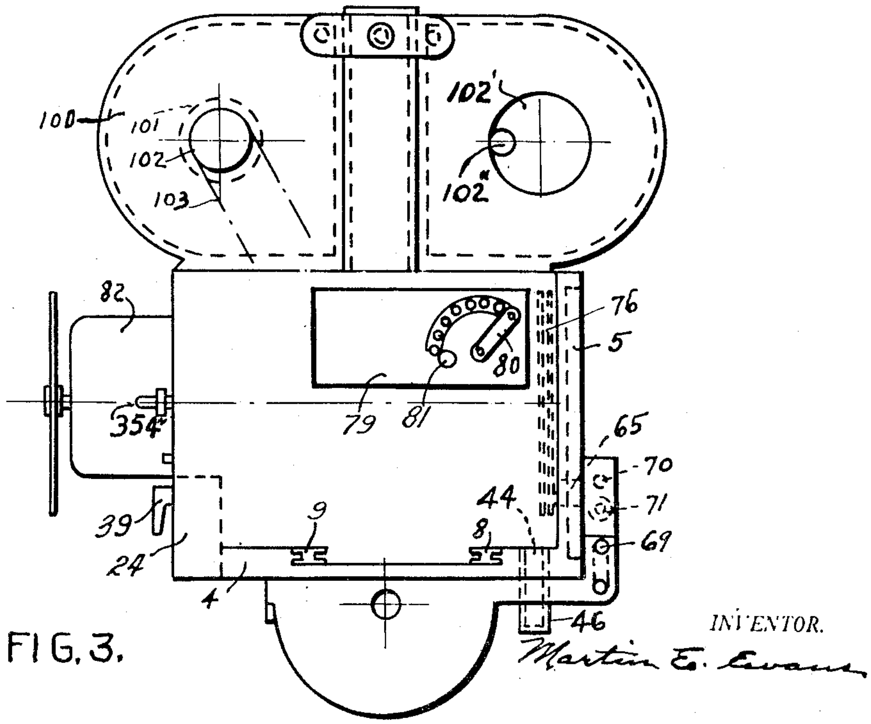
Fig. 3 is a back side view of the camera of Fig. 1.
Figures 8, 9:
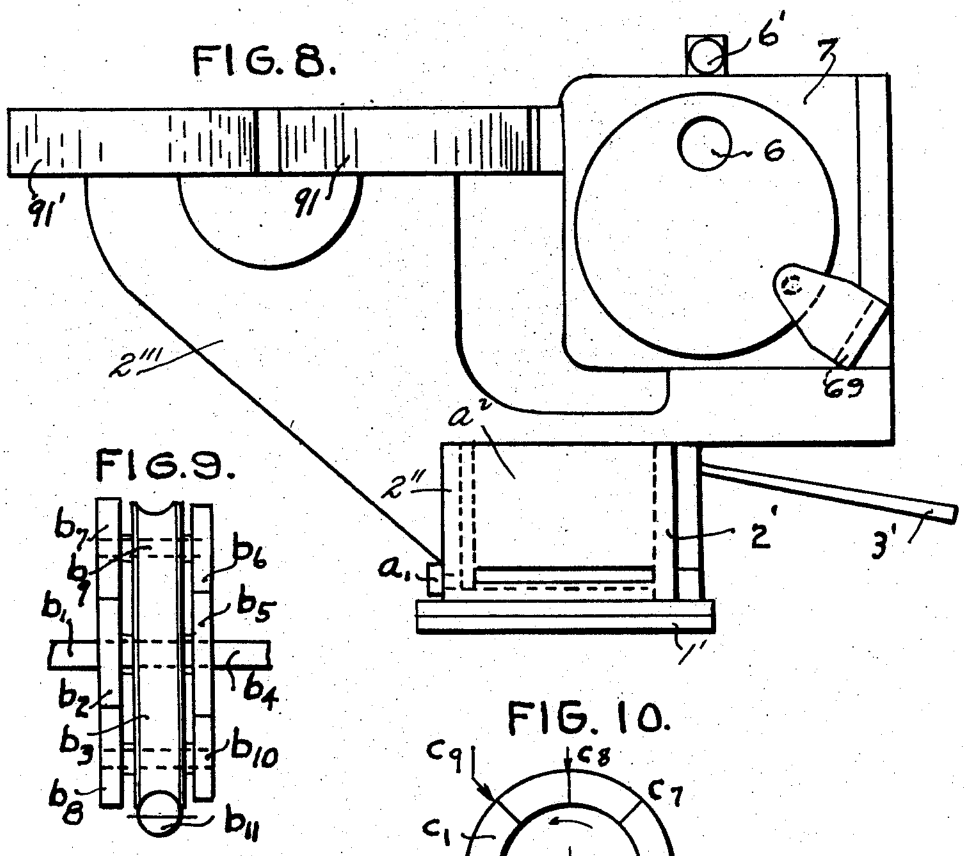
Fig. 8 shows a mounting for holding the recording camera and aligned magazines in a horizontal position.
Fig. 9 shows a speed reducing gear for phasing the input and output shafts.

The eye objective is shown in Fig. 47 as member 406 which is mounted on closure 393 of chamber 77, in front of the case 7 when the latter is upright, on top of case 7 when the latter is horizontal. As shown in Fig. 3, when the case 7 is shifted by handle 39 operating shifting mechanism 24, the case 7 moves over beams 8 and 9 and along base 4 carrying the beams out to position outlined under case 7' in Fig. 4. Turning the case 90° to the left from that shown in Fig. 4 brings the case 7' under the full outline shown of case 7. The center of rotation appears within the objective 6 as is apparent in Fig. 8. The outline 7' in Fig. 4 represents the extreme of the movement. Actually for operative purposes here outlined, for focusing for the television images extending lengthwise of the film, downward movement of the case is only about ⅓ of that shown. Referring to Fig. 1, the pivot 2a of head 2 may be placed in a vertical position with head 2 bearing thereon. An adaptation of this is shown in Fig. 8. There the support center is shifted to the left from under the case 7 to accommodate the shift of center of gravity.

As for example, refer first to Figs. 1 and 4, for the standard camera in vertical position and then to Fig. 8 for the camera in a horizontal position. The table 2''' may extend laterally sufficiently to support the magazine 91—100 and case 7 so as to allow the case 7 to be raised and lowered sufficiently to at least bring the telescopic part of finder 6' in alignment with exposure objective 6. Means for shifting the case 7, for example, may be a screw and nut. The movement of the case 7 may be of a distance suited to fully open the shutter chamber. The extent of the relative movement to this end is shown by 7 and 7' in Fig. 4.

Figures 6, 7:
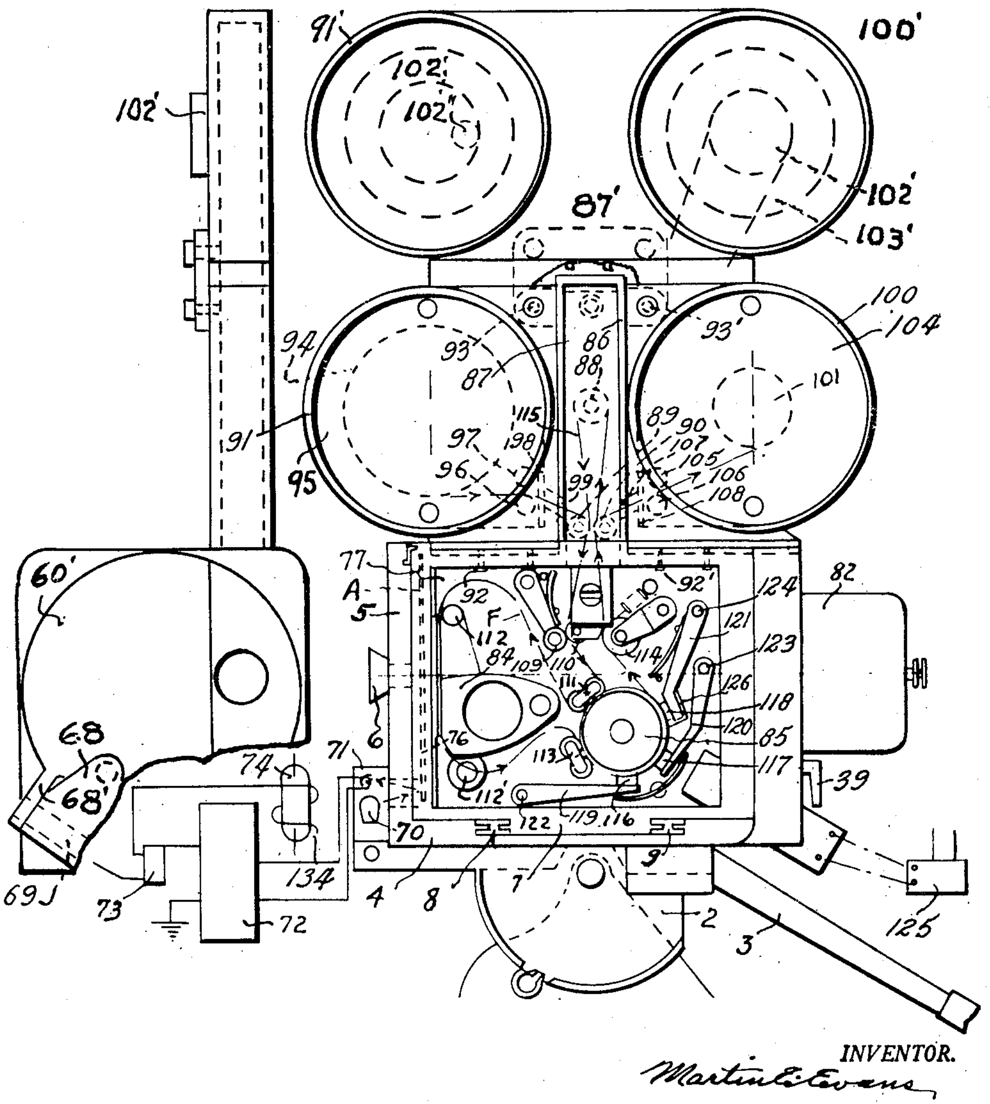
Fig. 6 shows a side view of the recording camera with two supply and take-up magazines.
Fig. 7 shows an end view of the two magazines above the recording camera.

Referring to Figs. 6 and 7, a second pair of magazines 91', 100' are shown above the usual film supply and the take-up reels. The supply magazine 91' is provided with brake disk 102' and solenoid brake 102''. By removal of top channel cap 87' the upper magazine is given direct passage into chamber 86.

This arrangement of superposed magazines provides for (1) supply of tape to the camera to cooperate with coils along the film operating path for providing electrical pulses at selected places and intervals for governing purposes later to be discussed; (2) for feeding positive film into the camera along with the negative film from magazine 91 when the apparatus is to print from the negative by use of light through the objective aperture; (3) for feeding negative film along with positive film from magazine 91 when the apparatus is to print from the negative by use of light reflected through a light tight system mounted in the film handling chamber.

Referring to Fig. 8, a lower support 1' carries an upper support 2' rotatably and tiltably mounted on member 1'. The member 2' has an upstanding tubular section 2'' wherein is provided a rotatable nut $a_2$ retained in place and rotated by stud $a_1$. The interior of the nut rides a threaded member upstanding with a bottom extension laterally and upwardly to members 4 and 5 shown in Fig. 3. The purpose is to raise and lower the body of case 7. The travel is sufficient to bring objective 6 and the rear element of finder 6' into alignment. The travel is attained without disturbance of the case 7 with respect to the magazines 91 and 91', 100, and 100'. It is also contemplated that the mask over the exposure aperture shall be enlarged somewhat to take full advantage of the film area available.

Fig. 9 shows diagrammatically in section only the essential gear arrangement of a speed reducing mechanism wherein the driver is the high speed pinion and the output shaft the larger slow moving element. Drive shaft $b_1$ supports drive gear $b_2$ and extends to mid section of spider $b_3$ where it is adjacent driven shaft $b_4$ which supports driven gear $b_5$. Gear $b_5$ is driven by pinion $b_6$. The ratio being 5 to 4 to reduce the driver speed of 1800 r.p.m. to 1440 as for 24 frame per second work. The gears $b_7$, $b_2$ and $b_8$ are of the same diameter. Shafts $b_9$ and $b_{10}$ are keyed to the gears they support. The spider $b_3$ is kept from rotation by worm gear $b_{11}$. This mechanism is appropriate for substitution for the phasing mechanism of Fig. 35. It provides for continuous phasing in either direction at a moderate rate of change by rotation of worm gear $b_{11}$.

Figure 10:
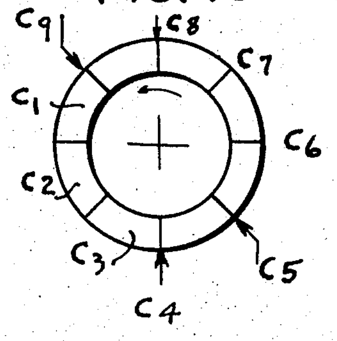
Fig. 10 shows a magnetizable disk arranged for dual input and output operation.
Figure 11:
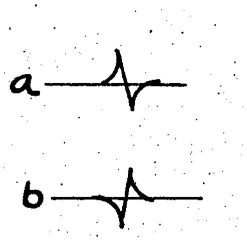
Fig. 11 shows wave forms of pulses from the operation of coils and disks, not shown but described.

Fig. 10 shows a segmented arrangement of the rim of a nonmagnetic flywheel having a magnetic coating. With the dipole coils in pairs the wave forms arising from flow of current are shown in Fig. 11. The two coils of a record pole piece as $c_5$ and $c_9$ are wound in opposition with a common ground between them. A sharp current pulse applied to one of the coil input terminals causes a positive or negative dipole to be recorded in the magnetic medium.

Referring to Fig. 4, the upstanding member 5 on the base 4 mounts a turret disk 60 which carries four lenses 6, 61, 62, 63, lens 6 being shown in position before the film aperture. Between the lenses enumerated are apertures and removable covers 64, 65, 66 and 67. These apertures extend through the turret disk 60. Upstanding alongside the member 5 is a housing 68 with pivot 69 in the base 4. On pivot 69 member 68 swings away from member 5 to give clearance for rotation of disk 60. In the housing 68 is a light source 70 and a photoelectric tube 71 shielded from each other. As shown in Fig. 3 and elsewhere, light from source 70 passes through aperture 65 to a revolving disk, to be later described, where the light is either absorbed or reflected back to tube 71. Reflected light activates the tube 71 the current from which passes to an amplifier 72 and associated electrical devices. As shown in Fig. 1, from amplifier 72 a line through a switch cabinet 73 carries a signal to glow tube 74 or to a television cathode ray tube 75.

Figures 13, 16:
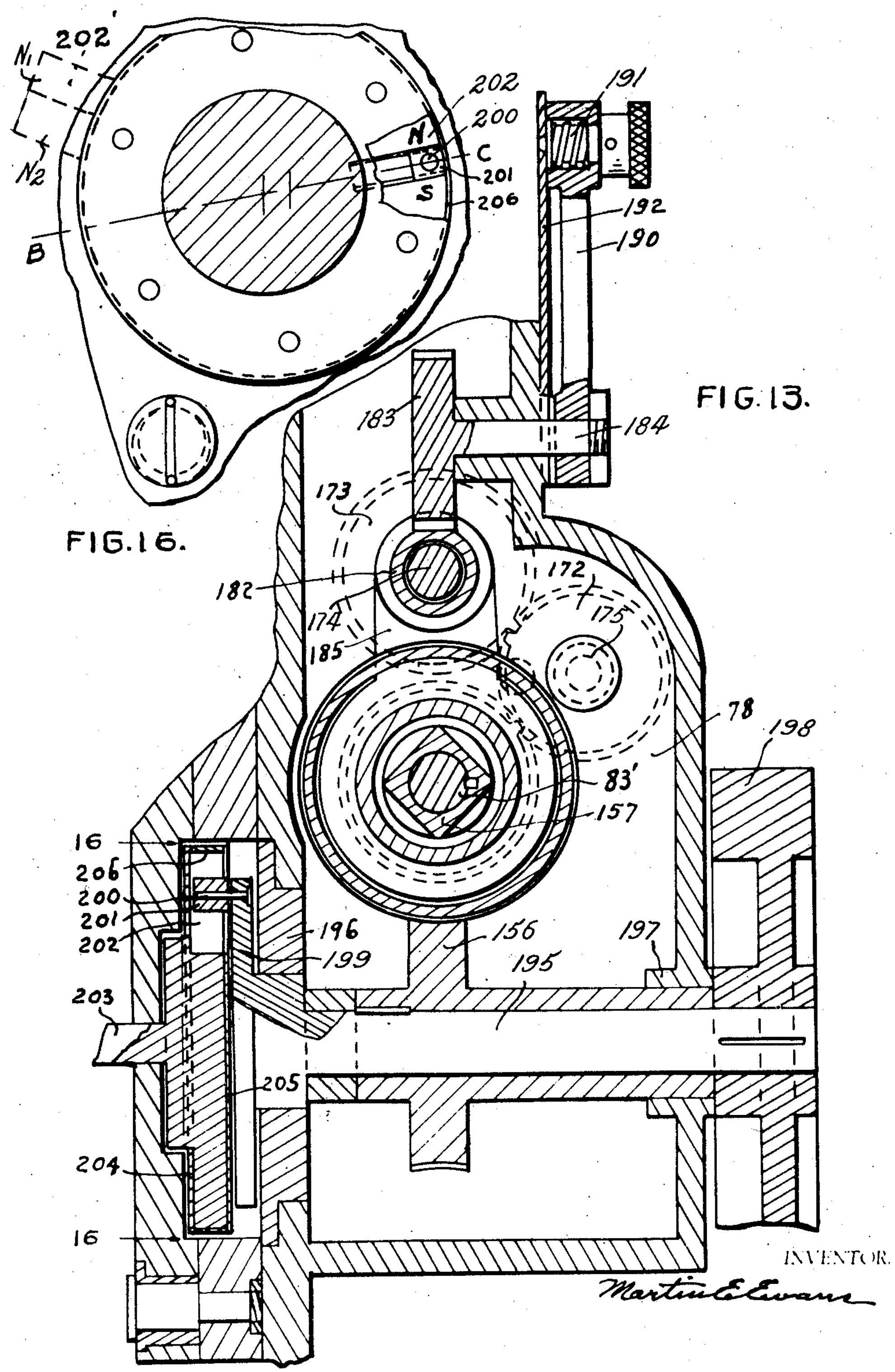
Fig. 13 is a sectional view along line 13—13 of Fig. 12.
Fig. 16 is a vertical sectional view of Fig. 13 along line 16—16 showing a driving connection to the pull down mechanism.

The cabinet is provided with a plurality of switch connections allowing formation of a plurality of operating combinations initiated by the electronic commutator in the shutter chamber and by the rotating pole piece NS in Figs. 16 and 13, passing coils $N_1$, $N_2$.

The light source 70 may be regarded as a source of radiant energy not necessarily visible since the visible part of the radiation may be screened out and only dark emanations would then be reflected back to tube 71. The tube 71 also may be defined to include that broad classification of light sensitive devices such as the selenium resistance bridge, the alkali metal photoelectric cell and the rectifier type, among the practical examples in that category. Also, it may be regarded as representative of the broad class of invisible radiant energy suitable for activating passage of electric current, the class also including electromagnetic and magnetic radiations.

The camera case 7 has a front end shutter compartment 76, a front side film handling chamber 77, and a rear side gear driving chamber 78 with an adjacent compartment 79 for accessories such as electrical connections, switches, resistances, shutter adjusting lever 80 and clutch control 81. From the motor 82 mounted on the rear of case 7 extends a drive shaft 83 through the gear chamber 78 to the shutter A in compartment 76. Intermediate of the motor and shutter, cross shafts take off power to drive the film pull down mechanism 84 and the film feed sprocket 85 in the film handling chamber 77.

The accessories above mentioned are organized particularly for control of the motor including its starting and speed regulation. The range of speed regulation from 6 to 24 frames per second is tabulated in Figs. 24 and 25. Where the motor is of the direct current type the resistances suffice to change the current for speed regulation and where the motor is of the alternating current type additional accessories not shown are organized as a packaged arrangement for the purpose. Where the compartment 79 is too small to accommodate these accessories they are necessarily placed in the electrical circuit leading to the motor and not shown. However, the manual control for the motor is preferably retained as an accessory with the compartment 79 for convenience in operation of the camera.

Referring to Fig. 1, on top of case 7 is a narrow vertical chamber 86 with removable cover 87 and at its bottom connecting approximately midlength with chamber 77. In the chamber 86 is an upper roll 88 and a lower pair of smaller rolls 89 and 90. To the left of the chamber 86 is a film supply magazine 91 held in place by bottom bolts 92 and top bolt 93. In the magazine 91 a film supply reel 94 is rotatably mounted and is accessible by unscrewing cover plate 95. The supply reel 94 is provided with brake disk 102' which is controlled by solenoid 102'' after the manner shown in Figs. 6 and 7 for the upper magazines. The solenoid may be controlled from the camera mechanism or from a control magnetic tape and associated coil, the latter receiving a pulse from the former for activating or deactivating the solenoid. A pair of rolls 96 and 97 in the magazine 91 guide film as it passes through light trap 98 and aperture 99 into chamber 86 to roll 89. To the right of chamber 86 is a film receiving magazine 100 held in place by bottom bolts 92' and top bolt 93'. In the magazine 100 a film receiving reel 101 is rotatably mounted and power driven through rear pulley 102 and belt 103 shown in Fig. 3. The belt and pulley are adapted by means not shown to be shifted to operate supply reel 94 as a take-up reel and reel 101 as a supply reel during rewind from reel 101 to reel 94 in preparation for running the film for picture recording after sound recording. Reverse operation of the shutter is provided for in the shutter detail. Magazine 100 is closed by screw plate 104. A pair of rolls 105 and 106 in the magazine 100 guide film as it passes from roll 90 on through aperture 107, light trap 108 to receiving reel 101. As the film leaves roll 89 it passes downwardly and between a pair of pressure rolls 109, 110 on to sprocket rolls 111 and sprocket 85, on in a loop to guide roll 112, on through the pull down mechanism 84 and out to a loose loop, then back over pressure rolls 113 and around sprocket 85 again and upwardly to buckle roller 114 and roll 90. In its passage from roll 89 around the path outlined back to roll 90 the film was in contact with an endless belt 115 which extends additionally from roll 90 up around roll 88 and back to roll 89 to complete the endless circuit. The belt is perforated and engages the sprocket and pull down mechanism the same as standard perforated film. When standard film is used the belt and film act as a unit. By matching the perforations the belt acts as a self threading device through the film handling chamber 77. Another use for the belt is described in connection with Figs. 51 and 52.

When the camera is operated with standard film and with belt 115 removed, the belt space between the rolls is readjusted. The roll 88 in its position shown in full line receives lateral pressure from rolls 89 and 90 through the incoming and outgoing film and belt. In the absence of the belt the roll may function in its position 88' shown in broken line. In this case the roll 88 receives lateral pressure from rolls 89 and 90 as direct force from the ingoing and outgoing film. Thus the pull force in the ingoing film originating between sprocket 85 and retaining rolls 111 becomes the pull force effective in the outgoing film between rolls 88 and 90. This pull force in the outgoing film presses the film against roll 114 and translates the film longitudinally over lifting shoe 438 and away from the sprocket 85. Any irregularities of pull in the film between rolls 90 and 106 by take-up reel 101 are practically nullified by the gripping action of rolls 88 and 90 in the position outlined. The essential positioning of rolls 88, 89 and 90 or their equivalents, whether they be located in the standard film magazine or in a special compartment 86 as shown, or in the upper part of film operating chamber 77, requires that they be arranged to transfer pull by one side of the sprocket to pull at the other side thereof through the film and belt or by the film without the belt in their ingoing and outgoing motions.

On the lower side of pull down mechanism is a mounting 112' for a second guide roll 112, thus providing inlet and exit rolls for film and belt to accommodate tight operation of the belt through the pull down passage for high speed continuous operation in connection with stroboscopic photography.

For continuous operation, the intermittent mechanism is rendered inoperative and serves only as a film guide. To this end the member 290 (Fig. 36) is swung to the dotted position shown, the mechanism is withdrawn laterally and suitable obvious adjustments are then made to make the drive ineffective. The pin 200 (Fig. 37) is shown with a shoulder to hold it in place longitudinally when replaced after withdrawal thereof. The pins 314 (Fig. 40) are shown with nut fastenings accommodating removal. With these pins removed the mechanism is turned so that the pins 292 (Fig. 39) are withdrawn from the film. It is thus seen that additional facilities are not needed for continuous operation of the film.

Referring to Figs. 1, 3 and 4 the pivoted head 2 carries a light proof film container 46 removably attached thereto, by means not shown, in communication through passages *2a*, *4a*, *7a* of members 2, 4, and 7, respectively, with film chamber 77 of the case 7. The container is of a width to accommodate the entrance of film $F_1$ therein, under propulsion of pull down mechanism 84, and exit therefrom under propulsion of sprocket wheel 85. In the container the film is in a loop which extends down to $F_2$ at the end of pull down operation and rises to $F_3$ at the beginning of pull down. This lower loop is of an initial length suited to provide the standard number of frames between the exposure aperture and the sprocket 85 for recording sound on the film. This length varies with the size of film.

The entrance *7a* shown as 44, Fig. 3, is provided with a self retaining stopper 45, Fig. 48, not shown in detail, for closing the passage *7a* when the camera is operated as a newsreel camera and the length of film between the exposure aperture and the sprocket 85 is suitably accommodated within the film chamber 77. It is obvious that the film cannot extend through passage *7a* when the case is to be shifted on the base to the extent shown in Fig. 4. As shown in Fig. 3, the container 46 extends upwardly through members 2 and 4 connecting with case 7. The dimensions of passages *2a* and *4a* in members 2 and 4, respectively, are adapted to accommodate movement therein of the container 46 in accordance with operating requirements.

Again referring to Fig. 1, around the feed sprocket 85 magnetic heads 116, 117, 118 are on arms 119, 120, 121 respectively, which are hinged on pins 122, 123, 124 respectively, and spring pressed against the film F on sprocket 85 and an associated guide as the film lifts from the sprocket. The film F carries material suitable for magnetic action by the heads to provide a sound record to accompany the film and be available for immediate replay. Pins 122, 123 and 124, details not shown, are adjustable longitudinally in their mountings to position the various heads crosswise of the recording material for cooperation between the heads and the recording material. Head 116 is an erase coil fed with high frequency energy to demagnetize the recording material. Recording head 117 contains a main audio winding and an auxiliary high frequency coil, the latter in series with the erase coil to secure proper high frequency excitation. The audio winding is preferably energized with signal current from an audio amplifier 125. Head 118 which carries a shield 126 to isolate it from the recording head, supplies an amplifier, not shown, from which the sounds being recorded are recreated and thus an immediate check on the recording is provided. Shields 126 may also be provided for the erase and recording heads where their close proximity to each other is a source of interference with their proper performance.

The shoe 438, above the sprocket 85, and the openings 124' and 123' in the back wall of chamber 77 are provided for the adaptation of the apparatus shown in Fig. 51, for alternate use for sound recording by inscribing action. In the latter event, the pins 124 and 123 are disengaged from their positions as shown in Fig. 1, thereby facilitating removal of magnetic recording and reproducing members with suspensions 121 and 120 respectively. After the electrical connections are disengaged for members 118 and 117, the suspenders 445 and 442, with their members 440 and 439 respectively, may be suitably suspended from openings 124' and 123' by pins 124 and 123 respectively, and then electrical connections again may be established. It is obvious that the suspenders 121 and 445, also suspenders 120 and 442, may be reconciled as single units to accommodate the alternate support of the sound reproducing and recording units for action by engraving or magnetization. When these members are not reconciled, spring 443 for support 442 is retained by pin 443'. Spring 119, removably supported by forked pin 119'', may be removed, allowing member 119 to rest on the bottom of chamber 77 when inscribing head 441 is in operating position.

Referring to Fig. 1, the pin locations 123, 123', 124, 124' and 443 obviously may be each provided with its own pin accommodating axial adjustment thereon of the respective hangers for the respective recorders and reproducers, members 120 and 121 being in one plane over a sound track, the members 445 and 442 being in another plane over another sound track. The dispositions of the pins as illustrated facilitate the shifting of the respective agencies across the film. Where the individual agencies are mounted in combinations paired on pins, as for example members 442 and 120 on a single pin, they may be shifted along the pin as a unit and thus preserve the relative spacing across the film and save individual adjustment. Recording operations are determined by the nature of the recording material and by its location on the film base. Each recording means is positioned to accord with the type of recording material to which it is adapted and to conform to the alternative operating procedure selected for following. Thus magnetic and inscribable recording materials may be arranged on the film base outside of the picture area to accord with the physical limitations imposed by the recording and reproducing agencies. The inscribable material, if of the variable light area type, would be recorded last for use with the pictures and the sound therefor would be taken from the magnetic reproducer. This by way of illustration only since numerous operating sequences are made available by the presence of multiple recording and reproducing agencies.

Where the recording stock is wide enough for three film tracks, the middle track may be regarded as the track on which the substitution will be effected by the movement along the supporting pins. In this case both combinations are employed on the three tracks. Where only a single track is available the substitution results in one of the pair remaining idle while the other is on the track. These procedures are useful in industrial applications.

Referring to Figs. 1 and 51, the magnetic sound recording head 117 and the inscribing sound recording member 439 are shown to function at a common point on the circumference of sprocket 85 to locate such recording on the film at a pre-selected distance from the coincidental image record. Also, light recording means retractably mounted but not shown in tube 77″ of member 77′ in the wall of chamber 77 is positioned to function at the common point. The recording members are mounted to be selectively positioned for operation at the common point, such mounting accommodating selective displacement from the common point.

Details of the photographic sound recorder are set forth in U.S. Patent 1,984,438. In this latter apparatus a slit unit is mounted on a shoe adapted to fit up against the sprocket 85 in contact with the film. A glow lamp is mounted behind the shoe. The slit unit, its mounting, and the lamp form a cylindrical assembly that can be adjusted longitudinally of the lamp and radially of the sprocket in tube 77″. Since these details are not parts claimed in this application they are mentioned without illustration to show the recording relationships here operative. It is obvious that the head 118 and support 121 may be shaped and dimensioned for support from opening 124′ and may be backed by shoe 438 in place of by the sprocket 85.

To bring the photographic sound recorder into action, either of the other recorders which may be in position must be displaced as before mentioned. Then the apparatus of U.S. Patent 1,984,438 is extended out of tube 77″ and into cooperative action with sprocket 85 and amplifying member 125, the latter supplying suitably modulated current to the glow lamp.

To bring the photographic sound reproducer into action, the film must first be developed, then operated over the sprocket 85 as in the taking operation and with the slit unit close to the film. In this case the glow lamp is replaced by a photoelectric tube connected to amplifier 125. Referring to Fig. 48, light from lamp 434 is reflected from mirror 433 through the film and thereby progressively modulated as it passes through the slit unit to the photoelectric tube. The photoelectric tube and amplifier 125 supply the modulated current to the sound reproducing agencies required. This well known procedure is presented only to provide full statement of cooperative action with the novel features of this invention. However, the provision of engraved sound modulations on the film for sound reproduction in the above manner is set forth hereinafter.

As shown in Fig. 1, the camera is set up to photograph a television receiver cathode tube screen 139. The accompanying sound signals for the receiver are supplied by leads 127 and 128 to loud speaker 129 from which leads extend to amplifier 125 and to head 117 for recording action on the photographic film. A dark tunnel 130, shown in plan in Fig. 2, and in vertical section in Fig. 1, excludes extraneous light from the lens 6 and tube 75. Access to the tunnel 130 is provided with side doors 131 and 132 which may be opened to provide a full view of tube 75. On door 132 is shown a light meter 133 for gauging the actinic value of the tube 75.

Tht original television images are usually lacking in contrast, therefore, it is desirable to exclude extraneous light to take full advantage of the contrast of the image on the screen.

A suitable circuit for energizing flash tube 74 is set forth on page 260 of Fluorescent Lamps, Forsythe and Adams, 1948 edition. The coil 134 around the tube 74 is a so-called "electric finger" to initiate the action of the tube. The action of the electronic switch for the finger 134 will be described later.

A suitable circuit for controlling the cathode ray tube 75 fits into the television circuits of the tube 75 which may be of the type having an indirectly heated cathode 135 and a control grid 136, a first anode 137 and a second anode 138. The picture appears on fluorescent screen 139. By means of a suitable battery 140 connected in series with a grid resistor 141 the grid 136 may be kept at a suitable negative bias. Through a coupling condenser 142 picture signals are imposed upon the control grid 136. To blank the tube the grid 136 may be driven highly negative by negative impulses generated by light 70 and photoelectric tube 71 by utilizing light reflected from the source 70 to the tube 71 by shutter arrangement A in shutter compartment 76 of case 7. Other equally effective control circuits to tube 75 may be employed, utilizing the shutter switch.

The photoelectric tube 71 is connected to the ingoing circuit of amplifier 72 in the outgoing circuit of which negative impulses are carried through a conductor 143 to the control grid 136. These impulses are represented at 144.

Operations of the tubes will be described later in connection with the shutter A in the shutter chamber.

The set-up in Fig. 1 is illustrative of the invention specifically applied to television. The inclusion of the tube 74 and control finger 134 controlled jointly with line 143 from amplifier 72 and members 71 and 70, and 76 or substitute, along with screen 139 and lighting means 75 behind the screen, provide a set-up analogous to that required for studio photography by intermittent light. Obviously, the tube 74 is not used in photographing the television screen. In studio photography a background is customarily supplied, variously lighted from the rear as by intermittent projection. It is thus seen that screen 139 (as is or enlarged) with member 75 may be regarded in effect as analogous to the background screen and rear lighting means. The projection lighting of the studio background is synchronized with the camera action and in the present set-up this is effected through line 143. So, broadly speaking, Fig. 1 may be interpreted as covering additionally the requirements for studio photography with intermittent background lighting.

Figures 12, 14, 15:
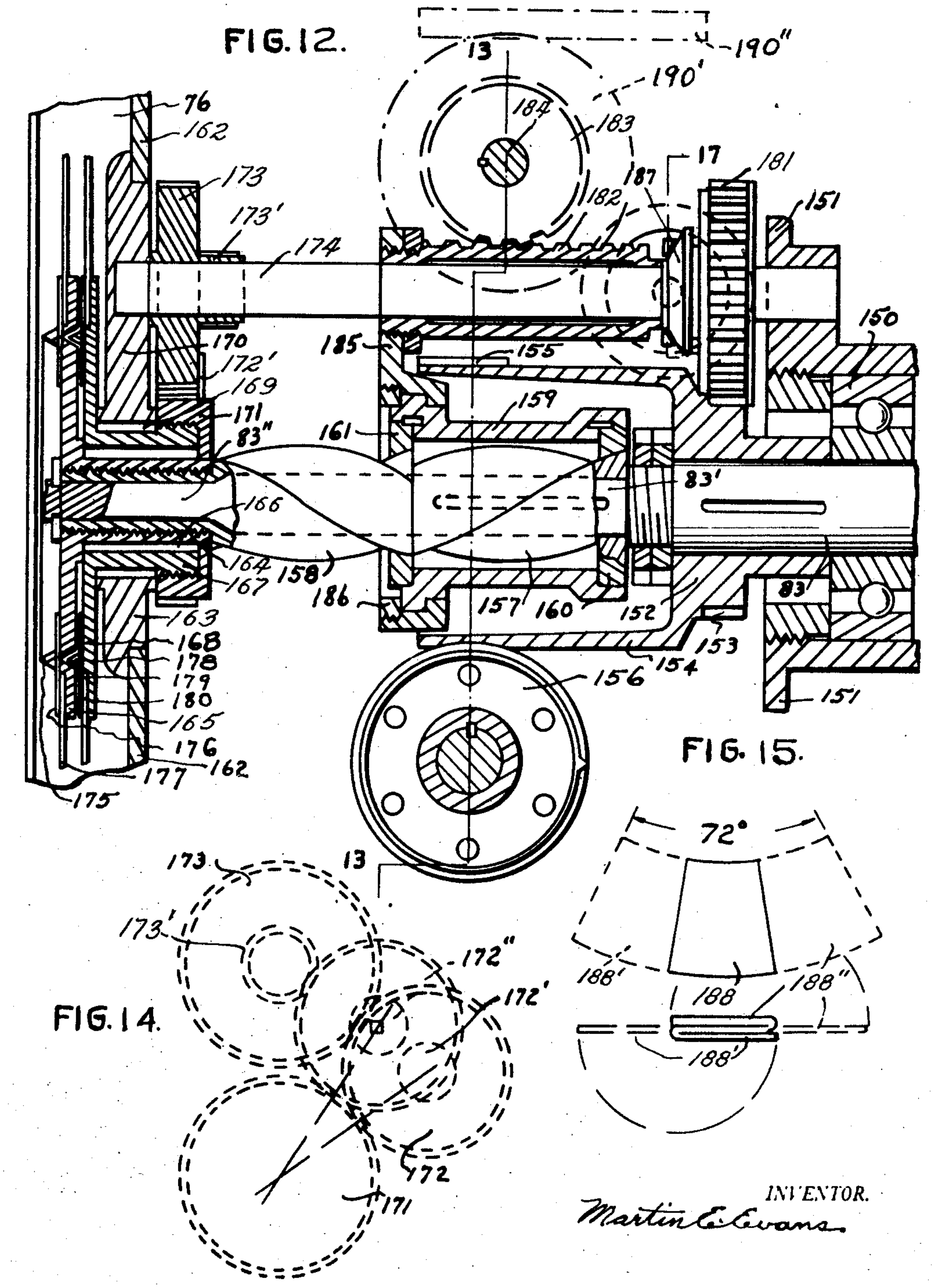
Fig. 12 is a partial vertical sectional view of the camera shutter and drive along the center of the shutter drive shaft.
Fig. 14 is a gear diagram of the final gear connection to the camera shutter.
Fig. 15 is one form of a sector for the shutter.
Figures 20, 21:
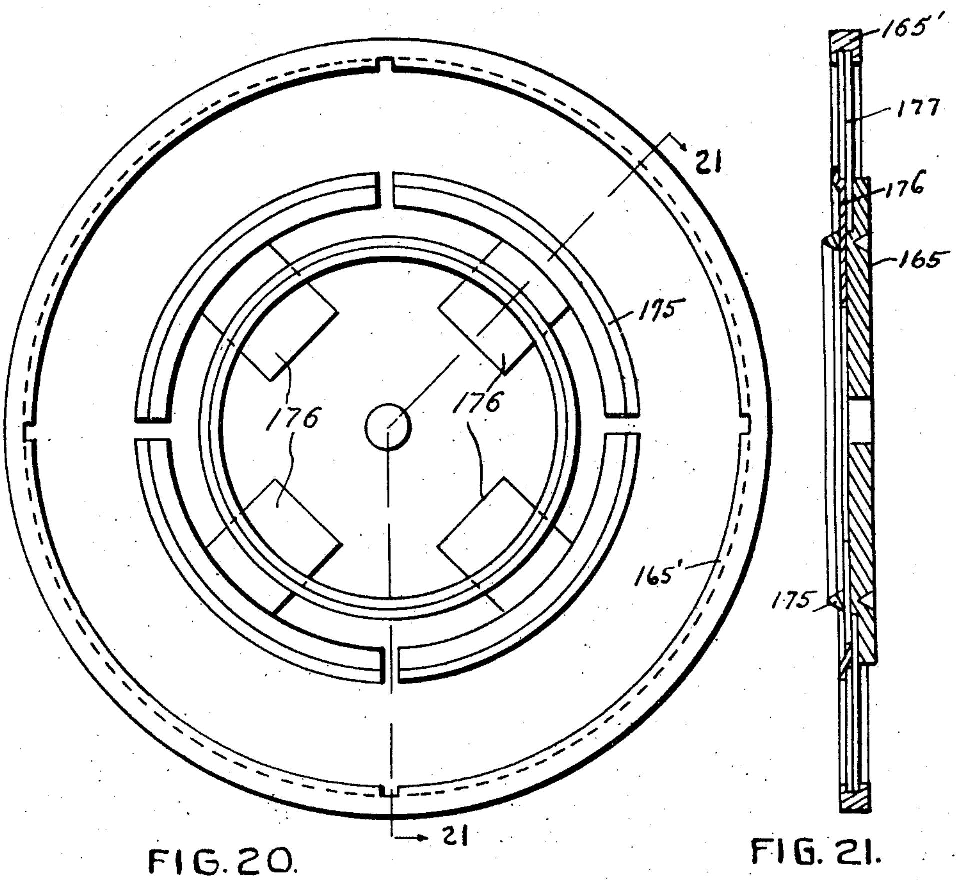
Fig. 20 is a front view of a shutter ring.
Fig. 21 is a sectional view along line 21—21 of Fig. 20.

Referring to Fig. 12, a longitudinal drive shaft 8s is shown supported by bearing 150 in a cross wall 151 in the gear chamber 78. Fastened to the shaft 83 is a hub 152 carrying a gear 153 on its periphery and a tube extension 154 with an exterior gear 155. The gear 155 meshes angularly with gear 156 fastened to a cross shaft which drives the pull down mechanism later to be described. On an extension 83′ to shaft 83 and having a reduced diameter is a compound screw of two members 157 and 158. These screw members are in end to end relation to each other, member 157 being keyed to shaft 83′ and member 158 being rotatably mounted on the same shaft. As shown in Fig. 13, members 157 and 158 are of square cross-section with the sides forming helices in relation to their axes. The direction of the helix of member 157 is the opposite to that of member 158. A tubular member 159 at one end carries a nut 160 fitting the helix of member 157 and at the other end a nut 161 fitting the helix of member 158. Members 159, 160 and 161 act as a long slidable nut over both helices and within the tubular member 154. Beyond the helix 158 shaft 83′ extends in a reduced diameter section 83″ through wall 162 and bearing plate 163. On the shaft section of 158 is screwed the hub 164 of exterior shutter disk 165. Around the hub 164 a series of bearing rolls 166 are held by the hub 167 of interior shutter disk 168. Around the hub 167 a series of bearing rolls 169 are held by bearing 170 in the bearing plate 163. The rolls are held from longitudinal movement by member 171 screwed on hub 167 and which carries a gear on its rim. Gear member 171 through an intermediate gear 172 is driven by a change gear 173—173′ on shaft 174 supported at one end in bearing plate 163. The intermediate gear 172 is supported on a two position stud pin 172′. The gears 173 and 173′ have a 3 to 1 circumferential ratio and are adapted to be interchangeable in their position on shaft 174. The pin 172′ occupies the position 172″ when the intermediate gear 172 is in mesh with gear 173′. The gear arrangement drives the shutters in opposite directions of rotation and at the same rate when gear 173 is active but at a 3 to 1 rate when gear 173′ is active. The shutter disk 165 is provided with a circumferential groove on the back face thereof and opposite the groove a rib 175 on the front face. Slots in the rib 175 accommodate holding plates 176 which press circumferential member 177 against the shutter disk 165. Circumferential rib 178 on the front face of shutter disk 168 meshes with the groove in the back of disk 165. Slots in the rib 178 accommodate holding plates 179 which press circumferential member 180 against disk 168. Grooved rims 165′ and 168′ are positioned around the outer edges of members 177 and 180 respectively and have radial slots cooperating with radially disposed slots between members 176 and 179 respectively to hold in place sectors of a nature later described. This construction is shown in Figs. 20 and 21.

The rear end of shaft 174 is carried in a bearing in cross wall 151. The shaft is driven through a clutch by gear 181 meshing with gear 153. Slidably mounted on shaft 174 is a rack member 182 operated by a meshing gear 183 connected to shaft 184 supported in the longitudinal wall of gear chamber 78. The shaft 184 carries an exterior arm 190, Fig. 13, having a stop pin 191 in the end thereof spring pressed against a positioning quadrant 192 adjacent thereto. A yoke 185 at one end is screwed and locked to rack 182 and at the other end encircles tubular nut member 159 with a bearing having retaining ring 186. The bearing is adapted to impart longitudinal motion to the nut 159 while accommodating nut rotation. Such longitudinal movement is effected by movement of gear 183 and acts to rotate members 157, 158 and the attached front shutter disk 165 relative to the drive shaft 83 and its extensions. As shown in Fig. 12 the rear end of rack 182 is adjacent to the face 187 of the clutch cone 211 and in a position to hold the clutch out of gear with the result that the rim gear 181 turns idly upon the clutch structure.

The shutter members 177 and 180 are variously constituted, in some cases of solid metal, in other cases of transparent material and with pellicle mirror coatings and with light obstructing sectors with suitable retaining means. The smallest light obstructing sector provided is of 24° width shown in Fig. 15, where member 188 is shown in plan and end elevation. It is a folded 72° section of a ring having 24° sections 188′ and 188″ folded over the middle 24° section. Suitable positioning means for sector 188 on the shutter are provided, as shown in Figs. 20 and 21, by slots in rim 165′ and matching spaces between members 176 through which the sector is fed to the retaining grooves. In operation cone 211 may disengage the clutch throwing shutter member 180 into open idle position. Then lever 190 controlling shutter member 177 may be operated quickly to make a single exposure when such is desired. Referring to Fig. 13, the gear 156 is supported on shaft 195 having a bearing plate 196 adjacent the pull down mechanism and bearing 197. The bearing 197 supports the over-hung flywheel 198 on extension of shaft 195. Adjacent the bearing plate 196 is an overhung disk extension 199 of shaft 195 carrying a crank pin 200 supporting a drive block 201. The block 201 fits into a disk 202 on shaft 203 which operates the pull down mechanism 84. The connection between the block and the disk 202 is in the nature of a radial slot covered wholly on one side by disk plate 204, partially on the other side by disk plate 205 and endwise by ring 206. The ring 206 preferably is of nonmetallic material, such as nylon, in order that the magnet may not be polarized. The alignment of the shaft 203 relative to shaft 195 is offset so that the action of the drive pin and block is to provide an acceleration of rotary movement of shaft 203 on its down drive of the pull down mechanism 84. As shown in Fig. 16, the sides of the slot for block 201 are in the nature of a magnet having N and S poles between which the block may be held in radial position when the pull down assembly is removed from pin 200. Pin 200 may be removed when the camera is to be used at ultra high speeds and the pull down is immobilized in which case the belt 115 operates continuously around guide rolls 112 and 112′. The offset of shafts 195 and 203 relative to each other and to the median line of the pull down action is shown on line B—C in Fig. 16.

Referring to Figs. 13 and 16, the rotating magnetic poles N and S sweep past a plurality of field coils 202′ arranged circumferentially of the disk 202 and indicated diagrammatically as $N_1$ and $N_2$ . . . . The field coils are movably mounted by means not shown for change of position as dictated by operating conditions. As the poles sweep past the coils, pulses in the latter are generated and passed on to transformers on amplifier 72 in accordance with their purpose. The pulses are timed by the position of the coils relative to the angular position of the poles.

At B′ is shown in dotted outline a coil for cooperation with the ring magnet of member 202, generating pulses which upon comparison with those from flywheel 422′ and coils 466, 467, 468, give the state of motion of the mechanism. Shifting lever 190 shown in Fig. 13, is shown replaced in Fig. 12 by worm gear 190′ and worm 190″, the latter having a connection to a motor not shown, the motor having operating controls not shown that utilize the pulses generated by coils and the magnetic recordings of the shutter.

Figures 17, 18, 19:
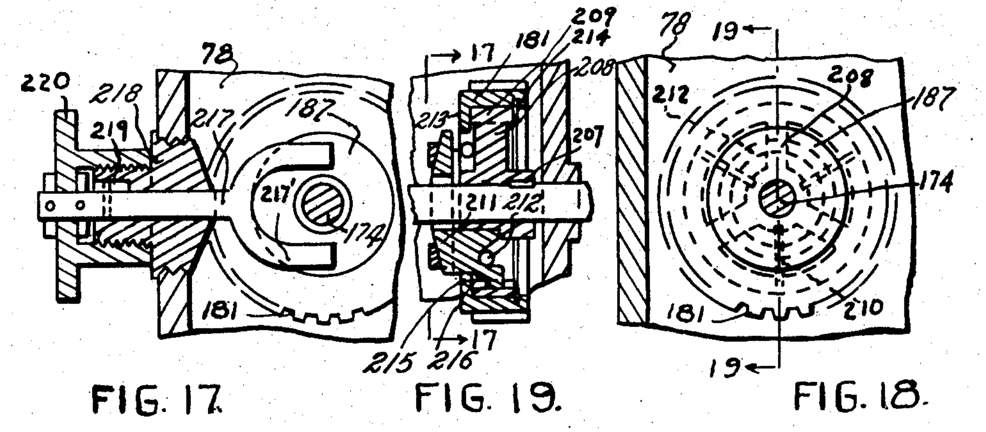
Fig. 17 is a vertical sectional view of Fig. 12 along line 17—17 showing the stop control for the rear shutter sector.
Fig. 18 is a vertical partial sectional view showing the clutch drive for the rear shutter sector.
Fig. 19 is a vertical sectional view along line 19—19 of Fig. 18 showing the clutch drive.

Referring to Figs. 17, 18 and 19, on shaft 174 is securely mounted hub 207 with three radial arms 208 extending to ring 209 supporting gear 181. Gear 181 is retained in position by flange 213 and snap ring 214. In the hub 207 are axial slots supporting wings 210 which extend radially to guide slots in ring 209. The wings 210 extend from cone member 211. Between the wings 210 and the arms 208 is a spring ring 212 which tends to hold the shoulders 216 of wings 210 in engagement with notches 215 in the gear flange 213 of gear 181. Against cone 211 is mounted a fork 217′ with stem 217 extending at right angles to shaft 174 and through a supporting bushing 218 in the wall of gear chamber 78. The bushing 218 has an extension 219 internally slotted in which slides a pin through stem 217 to keep the latter from rotating. On the extension 219 is threaded a bushing 220 through which extends the stem 217 and thus to the fork 217′ for adjusting the one on each side of the bushing 220 permitting the latter to rotate freely but transmitting axial movement to the stem 217 and thus to the fork 217' for adjusting the clutch. The clutch as shown is out of engagement. The clutch is also operated by the rack 182 but the mechanism just described is necessary to hold the clutch when the rack is removed from the cone 211.

Figures 22, 23:
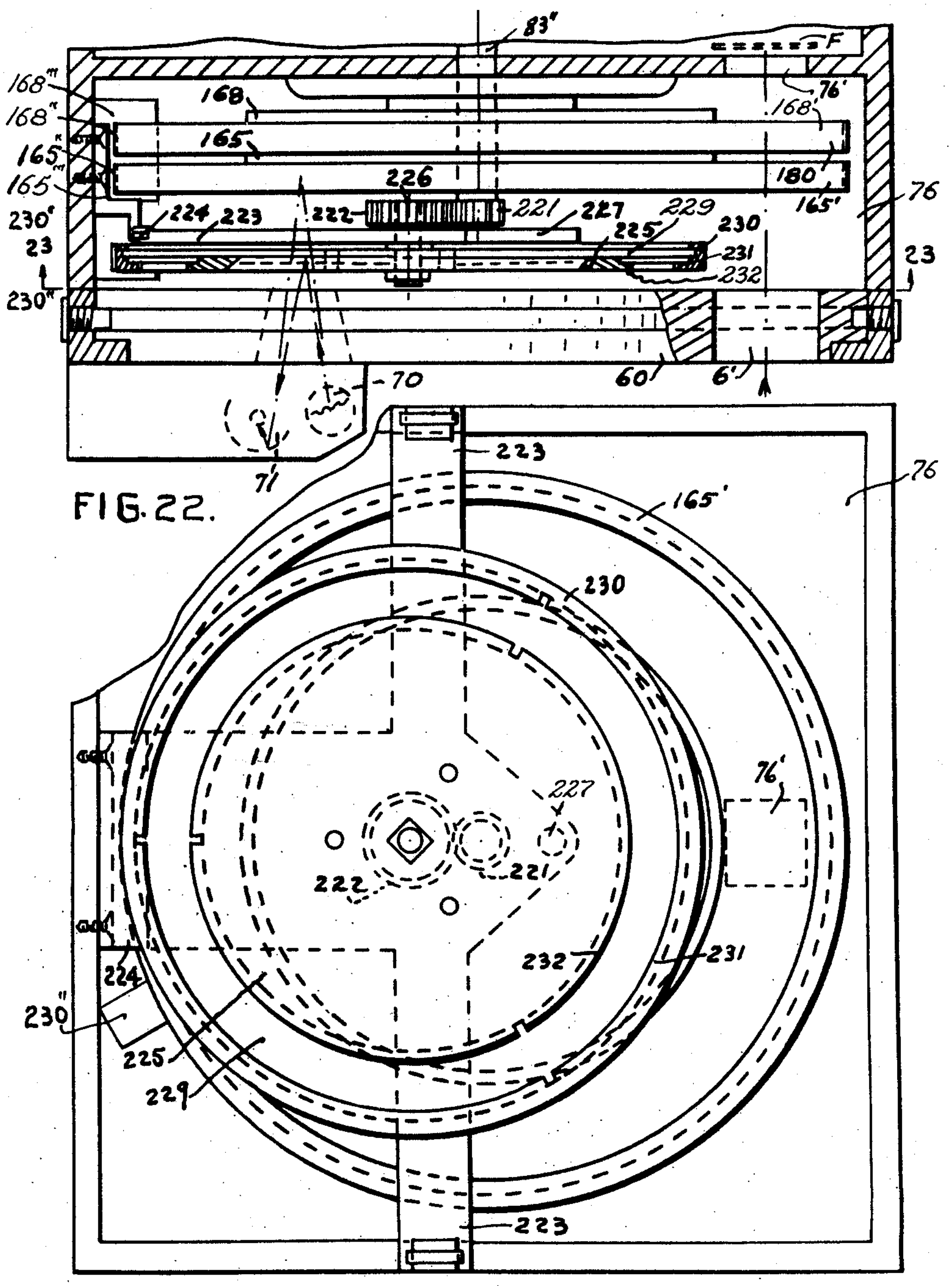
Fig. 22 is a partial horizontal sectional view through the camera shutter chamber showing one type of shutter.
Fig. 23 is a front view of the shutter chamber when open.

Referring to Figs. 22 and 23, in shutter compartment 76, the drive shaft 83'' is extended to carry a pinion gear 221 in mesh with gear 222 mounted on a support 223 hinged at 224 to the side wall of the compartment 76 and releasably anchored at the top and bottom of the compartment. The gear 222 is carried on a stud shaft 226 extending through a bearing in support member 223. On the front side of the support 223 a rotating disk 225 is mounted on the shaft 226. The disk center is offset to the left from the shutter center to clear the light aperture 6' of the lens turret 60 and 76' adjacent the film. The gear ratio of the gears 222 and 221 is 3 to 1 so that the disk rotates one third as fast as the shutter disks. The shaft support 223 is provided with a bearing 227 offset to the right of the shutter center for supporting the disk in suitable position to rotate in front of the exposure aperture when such operation is desired. The disk is a composite arrangement of a metal drive plate 225 pressed against a transparent plate 229 pressed against a shoulder on shaft 226 by the nut thereon. Pins from the metal plate fit suitable apertures in the transparent plate to maintain joint rotary movement. A rim 230 around the circumference of the plate 229 has an inward flange 231 spaced to provide a circumferential recess. A flange 232 on the drive plate 225 is spaced from the plate 229 to form a circumferential recess, the recesses by flanges 231 and 232 face each other and cooperate to retain therein charts of suitable material and design inserted through radial slots suitably placed. Aperture 76' in the shutter compartment is positioned in alignment with the aperture 6' in lens turret 60. The charts for the disk 225 operate the electronic switch comprising light source 70 and photoelectric tube 71 and associated electrical agencies for timing the operation of flash lights, cathode ray tube scanning, and shifting of color screens in the camera as later described.

In the absence of the members mounted on shaft 226, disks may be mounted on the first shutter member 177 and member 165' in which cases light from source 70 will be reflected to member 71 as shown by the lines between the members noted.

In Figs. 22 and 23, members 165', 168' and 230 respectively carry magnetic coatings 165'', 168'' and 230'. In operating relationship with these rim coatings are coil assemblies 165''', 168''' and 230'' responsive to magnetic dipole or other suitable magnetic recordings lodged in the rim coatings. Pulses from these coils due to the passage of the magnets adjacent thereto are conveyed to the amplifier cabinet and there utilized in accordance with requirements for governing motors, operating comparitors and giving indications of speed and other operating conditions.

Figures 24, 25:
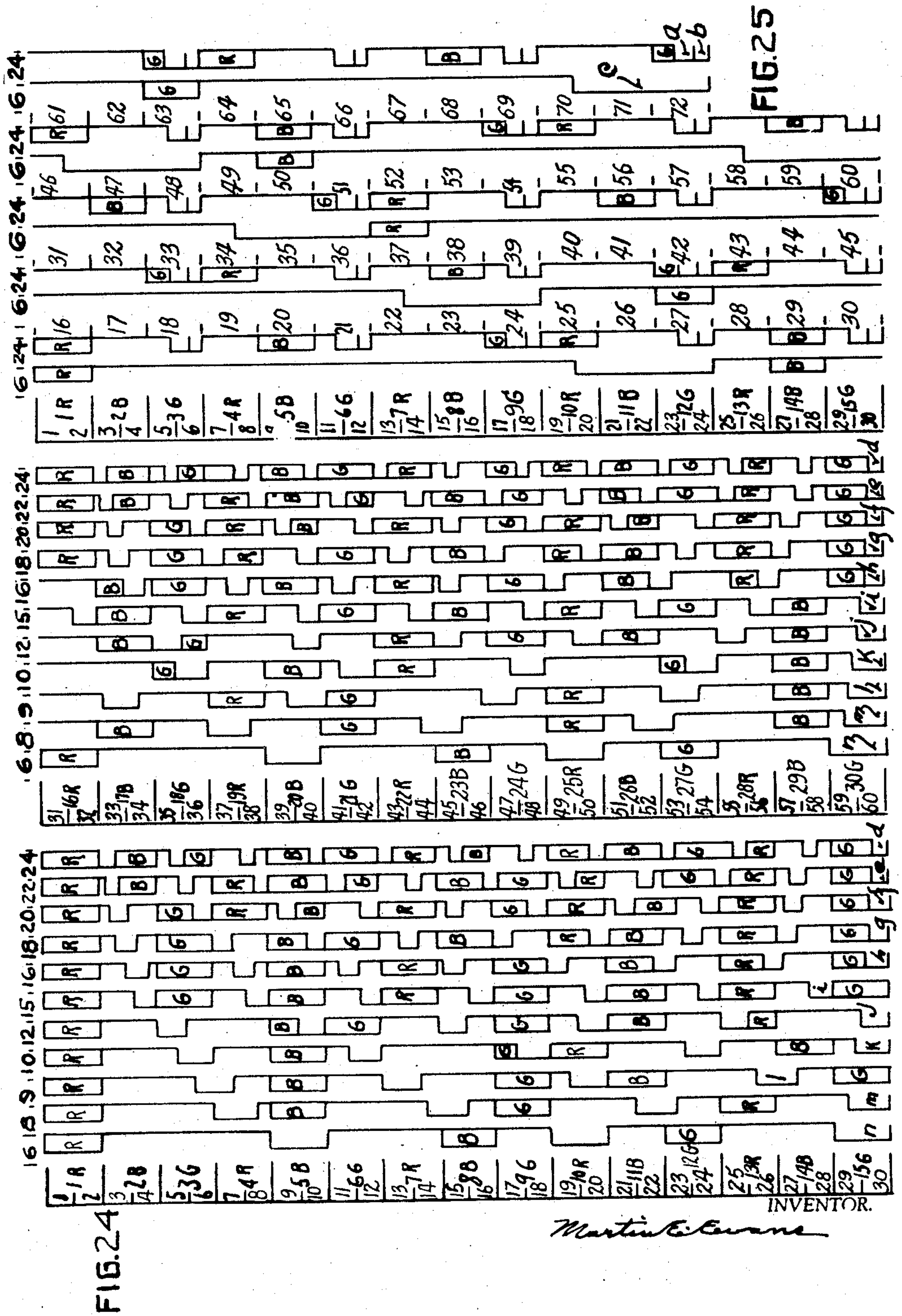
Fig. 24 is a divided time chart showing the relation between events on a 30 frame television tube screen and the operative activities of a motion picture machine operating at various rates.
Fig. 25 is a chart similar to Fig. 24 for a television rate of 72 frames per second.

Referring to Figs. 22 and 23 and Fig. 1, where the camera is set up to photograph a television tube 75, and assuming that the camera is to take black and white pictures at the rate of 24 frames per second, inspection of the graph in Fig. 24 under heading 24 shows that full and fractional fields fit together to give two field periods between pull down periods. The 72° shutter blanks out a half field for every picture frame, so that the shutter performance is satisfactory without control of the television electron beam. However, the television electron beam starts at the top of the tube and travels back and forth horizontally leaving a space between tracings until the bottom of the tube is reached, then it goes back to the top and traces between the lines previously made. Inspected through the camera lens, the top or first line appears at the bottom of the camera frame, therefore, the shutter should open from the lower side upwardly since it is behind the lens, this to avoid any exposure delay due to the opening action of the shutter. To accomplish this the two 72° disks are disposed one in structure 165' and one in structure 168' so that their trailing edges separate at the lower side of aperture opening 76' of Figs. 22 and 23. Further, the tracing of the electron beam ends at the bottom of its frame and the light therefrom appears at the top of the picture frame, and the 72° sector closing down on the top side will cut off this action by an amount represented by the angular width of the photo frame, whatever it may be, say "*a*." It is accordingly necessary to remove an angular segment of the value "*a*" from the clockwise moving 72° sector which now becomes 72°—"*a*" in angular value. Now clockwise moving sector 72°—"*a*" and counterclockwise moving 72° sector close down on aperture 76' from opposite sides and meet at the middle. So it is, that the aperture opens without detriment to the exposure and closes in a period less than the opening time.

Normally the two 72° sectors open the aperture on its horizontal center line and close on the same line thereby opening and closing in one-half those times for a single sector.

Again assuming that the camera is to take color values at a 24 frame rate, an inspection of Fig. 24, graph 24, shows that action of the mechanical shutter alone is insufficient to limit camera recording to single color values on a camera frame. Also, the sequential appearance of the colors is unsatisfactory at that frame rate. To get proper color value recording at 24 frame rate it is necessary to record at a lesser rate and to convert to the desired rate of 24. The rates and conversion repetitions are evident from perusal of graphs of Figs. 24 and 25.

Figures 26, 27:
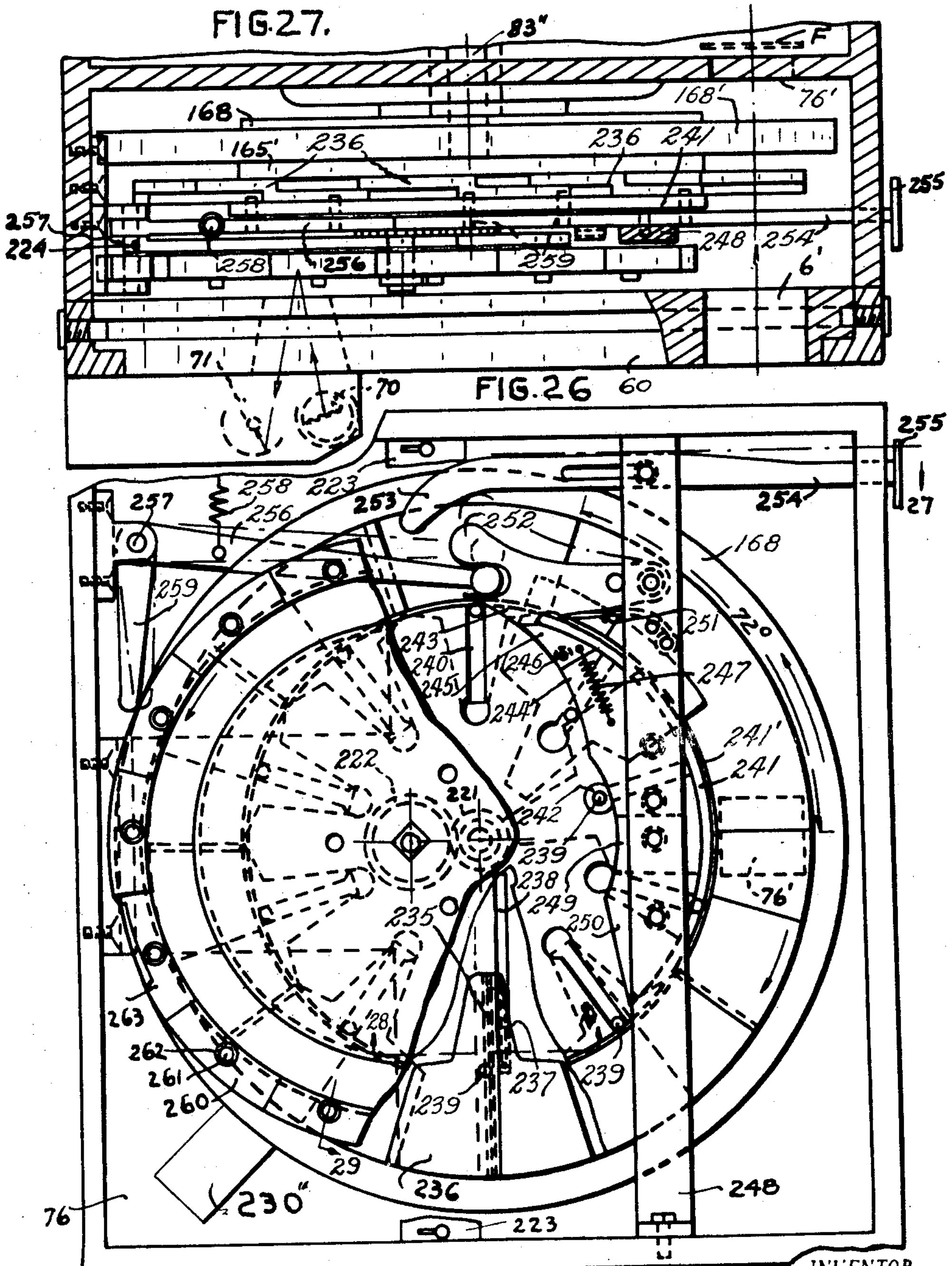
Fig. 26 is a front view of the preferred form of shutter with the shutter chamber open.
Fig. 27 is a partial horizontal sectional view through the shutter chamber on line 27—27 of Fig. 26.
Figure 29:
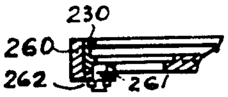
Fig. 29 is a sectional view of Fig. 26 along line 29—29 showing the cam sector for light control.
Figure 28:
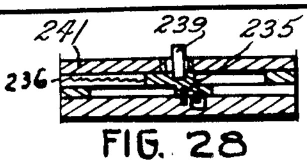
Fig. 28 is a sectional view of the Fig. 26 along line 28—28 showing overlap of radially movable sectors.

A preferred form of shutter is shown in Figs. 26 and 27. Disk 168 is driven by shaft and gears previously described. Disk 165' occupies the position of disk 165 previously described and is driven by the same members. Disk 165' is provided with radial inserts 235 at regular intervals which protrude sufficiently to form guides to overlying sectors 236 by fitting into grooves in the adjacent parts of the sectors and to propel the sectors in a rotary direction around the disk axis. Alongside the inserts 235 are grooves 238 extending radially to near the disk center in each of which is an extension spring 237 anchored at its outer end to disk 165' and at its inner end to the tail end of the sector 236. The sector 236 is fan shaped with the leading edge over-lapping the trailing edge of the adjacent advance sector. The overlap is just sufficient to complete the complete coverage of the shutter. The sector by reason of the overlap lies in two planes originating in the vicinity of the groove riding the insert 235. The two plane arrangement accommodates radial movement of the sector under impetus to an upstanding pin 239 at the approximate mid point of the sector. Pins 239 travel in slots 240 in a cover plate 241 over the sectors and are restrained at the outer edge of plate 241 by a rubber band 241' therearound which acts as a shock absorber to outward movement of sectors 236. At their inner ends slots 240 are enlarged to receive a ring 242 placed over a pin 239 to hold the sector at the inner point of travel. When the pins 239 are positioned with the rings 242 in place the springs 237 are extended in the slots 238 and urge the rings against the plate radially. The pins 239 extend beyond the plate 241 a distance sufficient to engage a pair of cams 243 and 244. Between these two members is a bridging cam 245 hinged at 246 to cam 244 and held by spring 247 to accomodate backward rotation of the sectors 236. Cam 244 is supported on upright 248 attached to the top and bottom of the chamber 76. Cam 244 has lower extensions 249 and 250 removably supported on upright 248. Cam 243 is pivoted on upright 248 and urged upwardly by spring 251. When the cam member 243 is in its upper position, an extension 252 contacts the angular portion 253 of a horizontal bar 254 slidably mounted on upright 248 and extending through the wall of chamber 76 to an operating knob 255. Below the extension 252 is a slot into which fits the end of an arm 256 mounted on one end of shaft 257 supported from the chamber wall. The arm 256 is urged upwardly by spring 258. On the other end of shaft 257 is mounted a depending arm 259 the free end of which contacts the circumferential surface of a series of cams 260 fastened by pins 261 and snap rings 262 to the rim 230 of the chart carrying combination. In place of cams 260 which maintain the arm 259 in an outward position and the arm 256 in a downward position, cams 263 are provided at suitable intervals to permit the arm 259 to move to the right, thus allowing spring 258 to raise arm 256 and cam 243 to permit pins 239 to pass to the outward face of cams 245 and 244.

With gears 221 and 222 operative the cams 260 rotate only one third of their circumferential path for each revolution of a sector 236 of the shutter. This gives three separate controls of the sectors 236. By dividing the one third path into five sections, each section represents 72° travel of the sector shutter, so that the length of sector 263 represents 72° on the shutter or two shutter elements 236. The space between adjacent pins 239 on elements 236 is 36° as illustrated so that the cam 263 has ample time to operate cam 243 to direct the pins 239 to a selected direction relative to guide cams 244 and 245.

The pins 239 being urged outwardly by springs 237 approach the cam 243 in a direction to receive shockless pressure to the inner face of cams 245 and 244 when the cam 243 is in down position as illustrated in Fig. 26. This inner path of the pins retracts the sectors 236 from over the aperture 76'. The retraction has a lead over the appearance of the sector in the vicinity of the aperture determined by the lead position of sector 263. When the cam 243 is in a raised position as in response to action of sector 263, the pins 239 pass to the outer faces of cams 244 and 245 and the sectors to which the pins belong pass over the aperture 76'. As the pins pass over the inner faces of cams 249 and 250 the sectors pass beyond the aperture area and are eased back by cam 250 to the outer sector positions. Removal of cams 249 and 250 permits the pins 239 to spurt to their outer position before the sector has cleared the aperture 76' and this is done for very short exposures at slow frame operation. The radial impact of the sector is absorbed by band 241' in contact with pins 239.

Referring to Figs. 26 to 29 inclusive, some of the operative arrangements are to be considered, as for example, shutter adjustments for projection operation. With all the pins 239 retracted radially and rings 242 thereon in plate 241 holding the sectors 236 away from aperture 76', and with rotary member 168 out of operative engagement by fork 217', the apertures 6' and 76' are cleared for projection operation, since the plate 168' is transparent and the light obstructing 72° segment thereon is positioned aside from the apertures when the fork 217' is as noted. Under these conditions and with a suitable flash disk held by flanges 231 and 232, rotation of the shutter through reflection of light from source 70 to member 71 effects suitable flashing of tube 74 mounted on the side of the camera temporarily. Light from the tube 74 reflected through the film passes through a suitable lens on turret 60 and on to a suitable screen not shown.

Again, consider rotary member 168 out of operation as just described and disk 165' in operation. Then referring to the cams 260 and 263, these may be arranged to retract or not retract segments 236 to the desired extent in increments of 36° of shutter angular movement to give the desired exposure. Flash controls may be activated if desired.

Again, color recording in black and white is taken as the operation desired. With gear 173' in operation and with red, green and blue color filters positioned on transparent disk 180 which now rotates 120° for each revolution of the shutter drive member 165', each exposure by shutter sectors 236 registers a primary color value which is recognizable on the developed film by reason of the position or outline of members 383, 384, 385, shown in Fig. 43.

Again, consider multiple shutter operation with flash light in studio work. With gear 173 in operation and a 72° light obstructing sector in position against disk 180, with drive disk 165' operative with two sectors obstructing passage of light through apertures 6' and 76' and with shutter rotation 24 times per second, the exposure is 1/30 second; flash operation 24 times per second, would give a single exposure per camera picture; however, the rate of flashing is objectionable. At least 48 flashes per second and preferably 72 per second of tube 74 are desirable by means of suitable flash disks retained by flanges 231 and 232. Assuming that the 72 rate of flashing is operative, it becomes necessary to reduce the period of shutter exposure to 1/72 second to get only one flash on a picture. To this end the aperture by the sectors is changed so that only two sectors 236 are retracted. Since there are three flashes for each frame at 24 frames per second it is necessary to choose which of the three will be utilized. This is done by manipulation of lever 190 so that the sector aperture is in alignment with apertures 6' and 76' when the selected flash occurs, and for the exposure apertures to be covered at other times.

Other operative adjustments and combinations are obvious, those just being mentioned are merely illustrative in a general way, and further elaboration would be tedious.

As illustrative of the charting of problems and their solution by this invention, reference is made to the recording of color television images on film. Figs. 24 and 25 record the time factors involved.

Referring to Fig. 24, this chart is in two divisions headed by frames per second operation of the camera ranging from 6 to 24 frames. Extending downward to the left of the headings are divisions from 1 to 30 in the first and from 31 to 60 inclusive in the second division. These divisions represent time occupied by a television field at the rate of 60 per second. Alongside these divisions are numerals representing the television frame time, two fields being used for a frame. Alongside the frame numbers occur the letters R, B, G, representing red, blue, green, the primary color occurrences which are transmitted by the noted fields and frames of television. The sequence of camera events and relative time periods are depicted in the vertical graph under each camera frame rate. The rectangular boxes represent the exposure periods. The line openings facing the right represent the pull down periods, and the line openings facing the left represent dark periods additional to the dark pull down periods. Thus under camera frame rate of 6 per second and opposite the fifth frame which is marked B we find in the graph the opening to the right indicating pull down period. The pull down period has been based on the use of a 72° shutter closure, the remaining 288° being open period. Also, the pull down period is shown to occur after exposure, so it is shown in all cases as the last occurrence in the camera cycle. The color values appear in black and white as first recreated on the receiver tube screen. Hence the need for color screens in photographing the screen is absent. However, an indicator of the segment of color analysis being photographed is necessary and this will be described later whereby the suitable color element is coupled with the photographic record for color reproduction. Under the 6 frame column the first exposure is shown in rectangle R opposite frame 1. The next three frames must be blanked out until the mechanical 72° sector appears for the pull down blanking. This is accomplished by direction of chart, Fig. 30, inserted in the control grooves provided by parts 231 and 232. The chart is divided into three sections of 120°, each section representing one camera frame. Each section is divided into five parts representing the five television frames occurring during the time interval covered by one camera frame. The sections representing pull down period are marked PD. Then four out of five segments are available for recording action in accordance with the requirements indicated by chart of Fig. 24. Area 270 is non-reflecting and in passing past the aperture before elements 70 and 71 exerts no action in element 71. The remaining areas in the 120° sector are reflecting and direct light received from 70 to 71 and so blank out the unwanted light on the television screen. After the pull down period 5B, on chart, Fig. 24, two unwanted television frames 6 and 7 occur and are represented by two reflecting areas followed by light non-reflecting area 271 which permits television frame 8 to be photographed. In the third sector, non-reflecting area 272 is preceded by one and followed by three reflecting areas each of which act to blank out unwanted images. The sequence of R, B, G, as thus outlined is observed to continue in the 6 frame graph. Another sequence of R, B, G, in the 6 frame graph is covered by chart, Fig. 31, where non-reflecting areas 274, 275, 276, appear in the same relative positions in their sections as in the above manner. Charts for the camera rates 6 to 24 frames per second may be made up from Fig. 24 graphs.

In Fig. 34*b*, a nonmagnetic disk base 280' carries a back pressure adhesive coating 281' and a front adherent layer 281'' of magnetizable material. The front surface of the layer 281'', as shown in Fig. 34*b*, is divided into segments of alternately light reflecting and non-reflecting properties. The operative action of the reflecting and non-reflecting segments depends upon the character of the photo tube 71 and the circuit therebeyond to provide the blanking pulse from amplifier 72 to tube 25 at the proper interval in the one case. In the other case to provide the igniting pulse to lamp 74. In both cases, multiple switching means are provided in member 73 for selective direction of the pulse or pulses to both units simultaneously. The ring, segments of which Fig. 34 is representative, are positioned on their driving members with sufficient tenacity to propel them past associated coils 282' positioned close thereto. The coils for recording, erasing and reproducing assemblies may be placed circumferentially out of the light path for purposes before described.

The disk surfaces are sprayed first with a layer of bonding cement, and then with several layers of a suitable iron oxide powder or mixture of powders. The oxide coating is then covered with a layer of cement and buffed to provide a hard surface.

The connections between the pulse coils and their circuits are of the plug in type so that the coils may be readily disconnected to provide flexibility of circuit combinations and circuit controls; as for example the fast pulse action incident to rotation of the largest diameter rotating magnetic layer may be substituted for the slow pulse action of the pull down mechanism and its drive at slow rates of operation.

The choice of camera frame rate for color projection depends upon the ultimate projection rate. For professional theater projection the frame rate is limited to 24 frames per second. The usual conversion from 30 frame rate to 24 frame rate involves split television frames which gives a scrambling of values when applied to color. This invention maintains pure color values by photographing full color frames and then arranging these in suitable combinations for 24 frame projection. Six frame pictures are each repeated four times, eight frame pictures are repeated three times, and twelve frame pictures twice. Fifteen frame pictures are all repeated with a loss of 6 frames from the repetition, such as 1-1-2-2-3-4-4-5-6-6-7-8-8-9-10-10-11-12-12-13-14-14-15-15. This gives repetition of the first two and the last two frames and alternate repetition of the intermediate frames. The method of repetition may be by photoprinting or by control of flash and pull down mechanism.

Referring to Fig. 25, graphs for camera frame rates of 6 and 24 per second and a television rate of 144 fields or 72 frames per second are presented, similar to Fig. 24. The horizontal line in the pull down portion of the graph indicates a division of the pull down time, $a+b$ being the pull down time for the usual running of the pull down mechanism, "*b*" being the time for pull down with overrunning operation, and "*a*" giving the additional interval of television picture made available for photography by the overrunning operation, so that full color fields are recorded as at 9G of the 24 frame rate.

For recording 72 frame television at 6 frame camera rate, reference is made to the chart, Fig. 32, where three 120° sectors are each divided into 12 areas, each area representing the time for a single frame of television. Areas 277, 278, 279, are nonlight reflecting and record R, B, G, respectively. The remaining areas are reflecting and so cut out the images in manner already described. From graph Fig. 25, it is seen that over two television frames occur during pull down time and that nine are available from which to choose for recording. Taking the first frame for the R recording on the first camera frame, the fourteenth frame for the B recording on the second camera frame and the twenty-seventh frame for G recording on the third camera frame a pattern is established for repetition. The other television frames occurring before the camera must be blanked out by the mechanical shutter and the supplementary electronic device controlled by the chart, Fig. 32.

For photography utilizing flash tube 74, with the camera operating at 6 frames per second and 48 flashes per second, 8 on periods and 8 off periods are required for the control circuit through members 70 and 71. The chart, Fig. 34, is so divided in each of the 120° segments, and areas 280 are non-reflecting while areas 281 are reflecting. The mechanical shutter must be adjusted and phased so that only one flash is recorded on a film frame.

Expressing the operating period in angular terms, with 360° as a cyclic period for the shutter and pull down, the flash period becomes ⅛ of 360° or 45 degrees which includes light and dark intervals of the period. By way of illustration, this period may be divided with 5° as the flash interval and 40° as the dark period. This then establishes 40° as the interval during which the pull down should occur and also as the interval during which the exposure aperture should be completely closed.

A bladed shutter in its operation has an initial interval of partial cut off, a succeeding interval of complete cut off, and a final interval of partial cut off. The complete cut off is the 40° interval of operation of the pull down mechanism just mentioned. Only the 5° period remains available for the initial and final partial intervals and this time is usually too short. An acceptable 11¼ degrees for each leaves a 22½ degree interval of the 45 degree period for pull down. Hence the need is new for means to switch from a 40° pull down at 24 frame rate to a 22½° for 6 frame rate with single blade shutter for elimination of flicker incident to flash lighting.

With two blades for the shutter operating in opposite directions, the blades begin to cut off from opposite sides of the exposure aperture and begin opening from the center, and the cooperative action is seen to cut down the initial and final operative intervals. Even so the two blade operation is usually unable to cut down the intervals sufficiently to make the 5 degree time suitable.

Regarding the shutter, taking 40° pull down period and 10° each for initial and final cut off, a total of 60° cut off action leaves a possible 300° exposure period, obviously too much for flash lighting. Hence it is necessary to provide means to limit this exposure period and to variably place the exposure opening of the shutter in that 300° arc. By variable placement of the opening, chosen instants of exposure are obtained of recurring phenomena such as in stroboscopic photography and similar instances where intermittent lighting is essential.

Other time intervals may be used, the foregoing being by way of illustrating the problem of adapting the intermittent lighting to general motion picture photography. Besides the general field of view and studio photography involved in the foregoing, special intermittent lighting situations arise. As for instance, motion picture photography using background projection and for television screen photography.

In taking pictures with background projection accompanied by intermittent front lighting, the synchronization of the front and back lighting with the shutter action is involved with the elimination of flicker in the front lighting. It is well known in work of this character that the camera shutter must be synchronized with the projection lighting on the back of the background screen to get the full amount of lighted background into the picture. The live subject matter before the screen to utilize the intermittent lighting must be spared the painful flicker attendant upon flash rates less than 48 per second. Since the flash rates to eliminate front flicker are the same as projection rates at the back, the two operations may be synchronized and timed in operation from a single source under the control of the camera man in so far as lighting of the background front and rear is concerned. The camera may be as much as 150 feet in front of the taking screen and the projector a like distance to the rear. U.S. Patent 1,601,886 illustrates the application with closeup front and back of screen arrangements of camera and projector. Action in front of the screen is variously combined with the projected background in the photograph by the camera. With the camera taking 6 frames per second and a synchronously operated projector providing background, the projector pull down and mechanical shutter again become inadequate. U.S. Patent 1,301,538 teaches coupling of projector and camera in front of the screen but the mechanical shutter is inadequate for 6 frame operation, flicker being prohibitive. A projector of the type set forth in Electronics issue of January 1949, page 97, utilizes a pulsed light source, an electronic lamp operated by a thyratron and electronic means for timing the pulses. Utilizing this projector the problem is to synchronize the thyratron with the front flash lighting and with the camera pull down. The foregoing is by way of outlining the problems to be met by this invention in various fields of motion picture photography by intermittent light, and where the pictures occur at a rate $b$ and the photography is at a lesser ratio $a$ and an exposure of $1/b$ seconds is practiced and no exposures for $1/a-1/b$ less the partial cut off period; also where $c$ is 30 per second and $d$ ranges from 6 to 24 inclusive.

From another aspect, this invention contemplates the use of the camera as a projector in converting say 24 frame film pictures to 30 frame projected pictures, projected on the mosaic of a television pickup tube not shown, where the transmission rate is 60 fields per second, for example. In this event, the pickup tube would occupy a position as of tube 75 in Fig. 1, and the light tube 74 would be mounted on the camera door in its operating position for projection. A control chart for tube 74 for the conversion would be constructed on the basis of providing 60 flash periods and 60 dark periods per second. An examination of the angular displacement of the chart shows that these recurring periods do not arise with the 3 to 1 gear ratio of members 222, 221, of Fig. 26, utilized to drive the chart on disk 229. With a gear ratio of 2 to 1 the chart revolves 12 times per second and has an angular displacement of 4,320 degrees. On the basis of 120 sectors in this interval, each sector would have a 36° angular dimension which can occur periodically in the circumferential path at suitably timed position to effect the required light operation. This assumes equal time intervals of light on and light off, a combined angular dimension of 72°. Now the periods of on and off are not equal. The on period must be brief, and occur during, say, the vertical blanking period in the operation of the pickup tube which is 8 percent at a maximum of the time for a single field. Eight percent of the field period of $\frac{1}{60}$ second is $\frac{1}{480}$ second or $\frac{1}{480}\times4{,}320=9°$ sector dimension. There are, then, on periods of 9° and off periods of $72-9=63°$. Hence, to provide the chart, we divide the angular dimension into five sectors each of 72° and then divide each of these sectors into two parts, one of 9° and the other of 63°. The 9° sector provides the activated period of the light 74 and the 63° period the dark period. The 9° sector is provided with a reflector that periodically directs light emanating from source 70 to photo tube 71 which activates light tube 74. It is, of course, understood that the camera is operated in synchronism with television tube in the manner well known to the art. Other rates of operation of the film and tube can be accommodated by due consideration of the timing of elements and charts as here illustrated.

In using the camera as a projector with flash tube 74 providing the illumination, and using 6 film frames per second and 72 tube flashes per second, chart of Fig. 33 is used. This chart has three 120° sectors each divided into 24 areas. Areas 282 are non-reflecting and areas 293 are reflecting, and they control the tube 74 as previously described.

With the pull down operating at the rate of 6 frames per second, and with light flashes for either the projector, the camera or the television tube occurring at 72 per second, it is necessary for some means to accelerate the pull down beyond the rotary angular rate of the uniform power drive. To this end a modification of the pull down of U.S. Patent 2,144,277 is utilized as shown in Figs. 36 to 41, inclusive.

On an L-shaped piece 285, identified in Fig. 39, is hinged pull down mechanism 84 by bolt 286 with eccentric washer 287 thereon adapted to position the pull down mechanism relative to the front upstanding branch 288 of the L member. Member 288 has top and bottom grooves 288′ and 288″ respectively, which removably support the structure in case 77 by engagement with case tongues 289 and 289′. The tongue 289 and groove 288′ are so arranged that after the member 288 has been moved laterally sufficiently for pull down mechanism 84 to become disengaged from its drive connection, the member 288 may be pivoted about the lower tongue 289. This is for the purpose of allowing compensating lens 6′ which is mounted on the member 288 to be removed from its position in the exposure aperture in case 7 when the mechanism 84 is moved into or out of the case 7. The assembly is held against removal by pivoted member 290 attached to the case wall. Fastened in an inset in member 288 is a plate 291, the two having aligned exposure apertures 288‴, 291′, respectively, fitted with color screens to be described later. Grooves 292 in the plate 291 accommodate entrance of pull down pins. The parallel back plate 293 and front plate 294 are held in spaced relationship by separators 295 screwing into plate 293 and receiving screws 296 through plate 294. Film guide plate 297 extends across the plates 293 and 294 and the intervening space. Plate 293 extends below 294 and rests on the bushing 287 which pivots the pull down to the L member 285. The pull down drive shaft 203 is carried by bearings 298 and 299, identified in Fig. 37. On the shaft 203 are mounted cam members 300, 301, 302 held in position by spacers terminating with exterior member 303 driven by the shaft and held in place by nut 304. The member 303 is variously shaped, as a washer, as a gear, or as a cam member in various illustrations to follow. Between the side plates 293 and 294 a pair of beam members 305 and 306 have their mid portions around the shaft 203 and possess forked end portions 307 and 308 respectively, which slide on blocks 309 and 310 respectively, at one end. At the other ends the beams possess cross members 311 and 312 respectively, with projecting pins 313 and 314 respectively. The blocks 309 and 310 are supported on adjustable eccentric bushings 309' and 310' respectively, with rim extensions 309" and 310" respectively, in which holes accommodate insertion of pins for position adjustment. The eccentrics are supported on a tie rod 315 with spacer plates between them and with spacer bushings 316 and 317 on their outer sides which are held by the tie rod against side plates 293 and 294. Rod 315 threads into bushing 317. Adjacent the pins 313 on cross member 311, bushings 318 mounted on member 297 guide the pins in their movement and serve to support the unforked end of beam 305. Beam 305 carries upright side extensions 319 against which cam 302 operates to impart thereto a reciprocating motion. Beam 306 carries horizontal extensions 320, 320' against which cam 301 operates and vertical extensions 321 against which cam 300 operates. Cam 301 moves the beam up and down. Cam 300 moves it back and forth. The combined action imparts an oscillatory motion. The offset position of shaft 203 relative to driving shaft 199 causes the shaft 203 to have an accelerated down stroke and a slow up stroke relatively. Acceleration beyond that due to the downward pressure of cam 301 is obtained by shortening extension 320' relative to 320, providing shoulder 322 at the end of 320' and cutting the heel of cam 301 between points 323 and 324 so that the shoulder 322 may ride down the cam face 324—323 under pressure of propelling spring 325. Spring 325 is anchored on one of the upper separators 295 and passes around the other which acts as a fulcrum. Referring to Fig. 40, the spring is shown in full line in the expanded condition at the end of a down stroke. In broken lines it is shown in the compressed state at the end of the upper stroke. The end of the down stroke is retarded by contact of beam 306 with spring member 326 which is anchored to one of the lower separators 295 and passes around the other as a fulcrum. Clip 327 on spring 326 by change of longitudinal position may regulate the shock absorbing action of 326. Also, clip 327 may be similarly placed on spring 325, in which case the downward movement of beam 306 would be continuously under the pressure of cam 301, the accelerated upward movement of beam 306 being arrested by spring 325. It is this construction which permits the down stroke with a rotary movement of approximately 24 degrees. The opening diameter of bearing 298 in the side plate 294 is intended to accommodate change of cam 301 whereby the tearing down of the pull down assembly is avoided for such replacement. The cam 301 may extend out to line 301' and the follower 320' may parallel follower 320 all the way across this yoke for certain types of operation. In this case the springs 325 and 326 operate to smooth the load applied to the mechanism. In Fig. 40, this cam 301 is shown under cut for special operating practice. However, the mechanism also may operate with the under cut restored as at 301' for the usual run of work.

To upstanding plate 297 and plate 293 top cross support 330 is attached to form a support for top film guide roll 331. Through the center of roll 331 extends rod 332 with knob 333 on the end thereof adapted to turn the rod 332 to lock the structure of the pull down in position adjacent the member 291. Opposite aperture 291' in the plate 291 is an aperture in which fits a frame 334 in which fit rolls 335 held in place by a spring 336 pressing against the closure of the frame 334. The rolls 335 operate to press the film toward plate 291. The pins 314 extend through the film and traverse grooves 292 in their downward path of travel. The interior of the pull down enclosure is accessible by removal of cover plate 337. Back plate 285 carries terminals 285' which have receptacles 28' for receiving terminals from a coil 334" later to be described as a replacement for frame 334. The terminals 285' engage and disengage automatically with receptacles not shown when the mechanism 84 is entered or removed from case 7 along guides 289, 289'. The terminals 285' are sufficiently removed from the frame 334 to allow the hinge movement of mechanism 84 on pin 286. The terminals not shown are carried by wall 174 and are connected to the amplifier 72 or 72'.

Referring to Fig. 35, drive shaft 83 is shown terminating in abutment to the end of the motor shaft 340. A sliding tubular coupling 341 joins the two shafts. It carries at one end keys 342 which slide in straight longitudinal grooves 343 on motor shaft 340 and at the opposite end it carries key 344 which slides in helical groove 346 in the drive shaft 83. Both shafts have bearings in case 7. Between shoulders 347 and 348 on the coupling 341 a fork 349 engages the coupling and extends with stem 350 to a combination movable parallel to the aligned motor and drive shafts. The combination consists of a threaded rod 351 threaded into stem 350 and beyond to couple to a stem 352. Rotatably mounted in the wall in case 7 and retained by lock nuts 353 bushing 354 carries an internal thread through which extends threaded rod 351. Member 352 in alignment with rod 351 has a bearing in frame of case 7. Rotation of nut 354 moves the fork 349 and thus shifts the coupling axially along the two shafts 340 and 83 phasing the pull down mechanism relative to the motor. Transparent thimble 354' internally threaded acts as a lock nut on rod 351 by pressure against bushing 354 and gives by the position of the end of rod 351 an index of the phasing position.

Referring to Figs. 42 to 47 inclusive, the pull down mechanism 84 is further developed to provide three color analyzing screens and actuating means therefor.

On the space plate 294 is mounted an assembly plate 355 by screws 356. On the plate is a stud 357 on which turns an internal gear 358 retained by snap ring 359'. Shaft 203 carries pinion 360 keyed thereto and retained by nut 304. The gear 358 encloses the pinion and nut and carries on its outer circumference a three place cam with segments 361, 362, 363, each a 120° arc and having faces radially separated a distance in accord with the movement they impart to a shoe 364 which is held against them by a spring 365. The ratio between gear 358 and pinion 360 is 3 to 1 so that cams move the shoe 364 once for each revolution of pinion 360. Shoe 364 is removably attached to the lower arm 366 of a bell crank of which the upper arm is 367. The bell crank is pivoted on pin 368 on plate 355. A stop pin 369 is provided to limit the travel of arm 366 under pressure of spring 365. Arm 366 is provided with holes for various positions of pin 368 to vary the relative length of arms 366 and 367. The free end of arm 367 fits in a fork 370 on the free end of a lever 371 pivoted at 372 in a recess 373 in plate 291. The recess 373 is covered by branch 288 of member 285. The recess 373 extends upwardly to house color analyzing frame 374 and then expands laterally to provide space for a spring therein, with the ends 375 and 376 pressing downward against frame 374. The downward pressure of spring 376—375 on frame 374 is transmitted to lever 371 at contact point 377, through fork 370 to bell crank 367—366 to shoe 364 and thereby to cams 361, 362 and 363 as they rotate, so there is no lost motion in the transmission. This is essential since in some cases the movement of frame 374 by the cams is microscopic.

The frame 374 covers the exposure aperture outlined in dotted lines at 378 in Fig. 43. The frame is held in place by a frame 379 shown in cross section in Fig. 38. The frame has top tongue 380 and bottom tongue 381 fitting into suitable retaining grooves. The top tongue and its groove are relatively deep. A space in supporting member 288 above the frame top is provided to accommodate upward movement of the frame 279 so that lower tongue 381 may be removed from its recess and the retainer removed for insertion of frame 374 in its adjacent position. The frame 374 is provided with a plurality of cross strips of transparent material which act as color filters, arranged in successive groups of red, blue, green, red, blue, green. In response to the action of cams 361, 362, 363, the frame 374 is shifted by the intervening linkage so that the exposure aperture area is fully covered once by each color for each revolution of cam wheel 358. The frame 374 provides filter strips 382 to keep the exposure aperture covered during all frame movement up and down. At the bottom of the frame are three characters 383, 384, 385, identifying the color filters blue, red, green, respectively, when rotating filters on the shutter structure are used. These characters cast their outline upon the part of the film outside the area subsequently projected on the viewing screen, in the manner set forth page 229, Rose's Cinematographer Handbook of 1946. In the present instance of reciprocation of frame 374, the characters represent positions one, two or three of the screen. In both cases the characters indicate the proper position of the color screens relative to the black and white film with which they are used for subsequent projection.

An alternate filter arrangement is shown in Fig. 46, where frame 374' is shown with lugs 386 to limit the down travel under spring 375. Sliding member 387 extends through frame 374' to engage spring 376 at the upper end and lever 371 at its lower end. Upward travel of member 387 is limited by its lower end structure. Midlength of the member 387 is a short projection 388 with an angular face adapted by its movement upward to force sidewise a contracting face on frame 389. Frame 389 is held against projection 388 by a spring 390 in frame 374'. Frame 389 is supported at its bottom end by member 391 which limits frame movement due to spring 390 to a horizontal direction. The frame 389 is provided with color filters 392 arranged in horizontal strips of green between which are strips made up of squares of the width of the green strip. The squares are alternately red and blue. The screen 392 is shown in the middle position of three which it occupies under management of springs 375, 376, and lever 371. Further upward movement carries all the structure within frame 374' which shifts the green strip to a position over the one previously occupied by the red and blue blocks. Further downward movement from the position indicated in Fig. 46, lowers projection 388 which allows the frame 389 to be moved to the left by spring 390, and thus the change in relative positions of the red and blue blocks. Access to chamber 77 is through door 393 hinged at 394. On the inner side of door 393 is mounted a stud 395 on which rocks lever 396 which has at its free end an inward projecting pin 397. The other end of lever 396 has a longitudinal slot in which operates pin 398 which extends from the outside through a longitudinal light sealed slot in the door 393. The pin 398 extends at right angles to the door 393 to an arm 399 on the armature 400 of solenoid 401 mounted on the door 393. Energizing of solenoid causes the armature to operate the lever 396 and swing pin 397 back and forth. When the door 393 is swung about hinge 394 to a closed position the lever 396 swings to the dotted outline position of Fig. 42, and pin 397 fits between shoe 364 and extension 402 of arm 366. Swinging of lever 396 by pressure of shoe 369 moves the armature 400 and the effect of this on the coil 401 may be used to indicate screen movement electrically. Coil 401 may be activated by connection to a television receiver circuit to synchronize screen movement with the television color analyzer.

Where three exposures are desired upon a single photographic frame, the gears 358 and 360 are removed and the cam 402, shown in Fig. 45, is substituted on shaft 203. Such removal is readily effected by removing snap ring 359' and nut 304. Cam 402 has large sector 403 and small equal sectors 404 and 405. The large sector 403 is larger than the other two by an amount represented by the indicated acute angle indicated by the arrows. This arrangement provides equal exposure periods for each position of the blanking screen. The relative angular size of the cams determines the relative exposures. The relative radial sizes determine the travel of the blanking screen. In some cases the travel is microscopic. The lower limit is in the neighborhood of 0.002 inch as established in Dufay color elements although this is subject to change in accordance with screen practice. On the door 393 is also exteriorly mounted focusing device 406 made available to the lens 6 by side shifting handle 39 previously described.

Referring to Figs. 48 to 50 inclusive, sprocket wheel 85 is shown as a composite structure made up of a transparent cylindrical element 407 mounted on an inner hub 408 to which it is riveted. Hub 408 is rotatably supported on tubular shaft 409 carried by frame bearing members 411 and 410 in the walls of gear chamber 78. Midlength of member 409 is mounted a gear 412 keyed to the tube and driven by gear 413 mounted on main drive shaft 83. Tubular shaft 409 is below and at right angles to drive shaft 83. Extending through the tubular member 409 is shaft 414 which has a reduced section 415 in the vicinity of hub 408. Over the section 415 fits plate 416 dowelled in the shaft 414 and there held by pin 417 to rotate therewith. Plate 416 is riveted to hub 408 and transmits motion thereto from shaft 414. Under some circumstances plate 416 and ring 418 are constituted as a unit and serve to drive the film supported on cylinder 408. Both ends of cylindrical member 407 have notches into which fit the teeth extending radially from rings 418 and 419. Adjacent the bearing 410 the tubular shaft 409 has radial arms 420 and 421 which fit within the rim 422' of flywheel 422 supported on an extension beyond shaft 409 of shaft 414. Flywheel 422 is keyed and locked on shaft 414. Extending radially inwardly from rim 422' of flywheel 422 are lugs 423 and 424. Between the lugs and radial arms and supported on extensions thereof, are springs 425, 426, 427 and 428 which establish yielding drive connection between tubular shaft 409 and axial shaft 414. In a cavity 429 on the inner side of the hub of flywheel 422 is carried a ball adjacent the face of bearing 410 against which it is pressed by a yielding member 430 in the cavity 429. The face inside the cavity against which the ball presses is angularly disposed so that the ball under the pressure of the yielding material is wedged between the flywheel 422 and the bearing plate 410 on the backward rotation of the flywheel. This lock against backward rotation is used only in those applications where motion is harmful as where needle recording of sound on film on sprocket 85 is undertaken.

In operation, the irregularities of driving force between sprocket 85 and gear 412 are smoothed out by the floating action due to the springs.

The inertia effect of flywheel 422 is supplemented in its action on sprocket 85 through belt 115 in contact with member 88. In certain cases of slow speeds of operation where the wheel 422 is insufficient, the mounting for member 88 extending to the rear carries a supplementary detachable wheel not shown in detail since its operation at the professional rate of 90 feet of film per minute would provide a possible overload. Its location lends to manual detachment and lightening of the portable combination. Referring to Fig. 5, the supplementary wheel is shown in dotted outline coaxially with pulley 88'. The wheel, being positioned exteriorly of the camera case is not limited in its diameter by the latter and as shown is relatively larger in diameter than wheel 422 purposely to provide a relatively larger stabilizing action for a given rotary movement at a relatively slower speed.

Momentary variations less than 8 cycles per second are annoying by reason of the change in pitch which they produce. Such variations between 8 and 100 cycles per second are recognized in roughness of tone quality. These inertia devices to remove the variations in connection with reproduction of sound are also coupled for use with the sound recording and in this service both devices provide a cascade action new to picture and sound recording apparatus. Within the ranges cited objectionable variations are suppressed.

Referring to Fig. 50, nonmagnetic flywheel 422 is provided with a magnetic surface layer of approximately 0.005 inch thickness. Erasing head 466, recording head 467, reproducing head 468 are operatively positioned around the wheel. These may be used for various purposes. With each of these members capable of dipole operation, and operating in separate lands, and say 50 poles recorded to the inch and the poles staggered relative to each other, the equivalent of 150 surges per inch of circumference and a circumference of 10 inches, it is seen that at 24 frames per second $150\times10\times24 = 36{,}000$ cycles per second are provided for application to speed regulation and other usages.

The door 393 hinged to case 7 is held in horizontal position by plate 77′ when the door is opened for converting the camera to a projector. With such door position, thereon is mounted a standard 431 by thumbscrew 431′. Member 431 has an arm 432 fitting over the extension 415 of shaft 414, thus supporting an angularly disposed mirror 433 within the tubular transparent member 407 in a position to reflect light from a tube 434. Light from tube 434 reflected by mirror 433 is directed through member 407 and against a film thereon in continuous motion. The light passing through a sound record path on the film is utilized in means not shown to recreate the recorded sound.

On door 393 standard 435 is held by thumbscrew 436 in position adjacent pull down member 84 to support tube 74 and a mirror not shown which directs light through the aperture uncovered by removal of roll holder 334 shown in Fig. 38. The light passing through the said aperture passes through the film between members 291 and 297 of the pull down and out to the projecting lens mounted on turret 60. A suitable condensing lens adjacent flash tube 74, also, is contemplated to be in the set up.

While the light 434′ is shown mounted on the door 393 with the door open, it may be mounted on the door in its closed position with light guard and mounting means not shown. This latter mounting would be operative to provide reproduction of sound in the same manner as previously outlined for Fig. 48, but not for monitoring purposes where the sound record is inscribed before the picture is recorded. It is well known to have the stylus 439 operate transversely of the film to remove pigment or other light obstructing material carried by the transparent base to provide a variable area modulated by sound.

Referring to Fig. 51, an enlarged view is shown of the conveyor belt 115 on which is provided a flap or guard 437 with the tail in the trailing position and beneath which the lead end of film F is to be tucked for threading through the mechanism in the circuit back to roll 90. At roll 90 the flap is lifted and the lead end of the film F is threaded around reel 101. As the conveyor 115 and accompanying film pass from feed sprocket 85 and over shoe 438 the shoe acts to lift the conveyor and film off the sprocket and to support the film in position for sound reproduction by stylus 440 acting in a groove produced by preceding stylus 439. Member 439 is electromagnetically activated to engrave on the passing film a groove of varying depth or varying width or a combination in a manner well known to the art of recording sound. Member 440 operating in the groove just formed agitates associated electromagnetic means which causes variations in an electric circuit that form the basis for sound reproduction. The stylus 440 immediately following the engraving operation provides an immediate check on the adequacy of the engraving operation. Stylus 439 in case 441 on arm 442 is pivoted to swing toward the sprocket 85 under the impetus of spring 443. Stylus 440 in case 444 on arm 445 is pivoted to swing toward shoe 438 under the impetus of adjustable weight 446 on arm 447.

The apparatus is adapted to various sequences of operation. The obvious sequence is shown in Fig. 1. Another sequence may originate in recording the sound and then recording the pictures, utilizing the sound record during picture recording to give aural guidance for facial expression or action to the actors in the field of the camera. In this sequence the film may pass with a single continuous arc of contact around the drive sprocket and by-pass the pull down on its way past the recording and reproducing stations. As the sound is recorded it is reproduced from the record rather than from the usual input modulations so making a check on the adequacy of the record. Thus if the record is inadequate it may be erased by reverse operation of the film past the erasing head and again on the forward motion of the film as the corrective recording occurs. When this recording takes place, the intermittent film feed mechanism may be entirely removed by movement of latch 290 shown in Fig. 36, and by lateral travel along the tongue and groove mounting. In this case the feed to and the take-up from the usual loop of film by the sprocket may occur in the vacated space.

Another sequence of operation involves the recording of the pictures first, then development of the pictures, then the recording of the sound while using the apparatus as a projector, then fitting the sound to the action depicted. Here either stylus or magnetic recording may be employed.

Another sequence of operation involves recording the sound first, then the pictures using sound record for picture direction and adding sound as the pictures are taken, the latter by lateral adjustment of the stylus recording medium as published in "Sound Reproduction," G. A. Briggs, published by Wharfedale Wireless Works, England, 1950, reference page 132.

Again, a sequence of operation contemplates recording sound first by stylus after the Phillips-Miller system of the above reference, then simultaneously recording pictures and reproducing the sound for direction of the picture, sound reproduction by light suitably guarded and directed from the interior of and through the sprocket to the sound record. As the light passes on from the modulating film, through the slit unit fitting up against the film and through the cylindrical mount for the slit unit to the photo tube activated by the light, as recited for reference U.S. Patent 1,984,439, the sensitive picture emulsion is shielded from the light by the yielding movement of the shoe supporting the slit unit. Additional sound record at this time may be provided by having the engraving tool 439 and actuating member 441 substituted for members 440 and 444 (shown in Fig. 51).

In view of these various sequences of operation of the apparatus herein disclosed, the sprocket 85 assumes an added importance over that accorded it in the usual picture and sound camera combination. It continues to be a feed and take-up sprocket in the usual sense. However, it does more than that by reason of (1) its position in the assembly, (2) its peripheral rate of travel, (3) its arrangement to operate on photo sensitive film for sound recording, and (4) its construction. Its position relative to the magazine and sound devices enables them to function by themselves as a sound recording and reproducing assembly, eliminates manual handling of the film in placing it for picture taking after sound recording, and makes a single magazine serve for running the film at separate times for sound recording and picture recording irrespective of which operation takes precedence.

The sprocket peripheral rate of travel when functioning in the sound recording assembly determines (1) the disposition of the sound record longitudinally on the film and (2) the lineal travel rate of the film. By providing the same sprocket peripheral rate for the film when recording sound as will be provided when recording pictures synchronous operation of sound and pictures is assured during projection. This is provided for automatically where the sound and picture records are made simultaneously on film propelled by the single sprocket, obvious, but quite overlooked usually as a function of the sprocket as operated during simultaneous recording.

The sprocket's operation on the photo sensitive film is exclusive to this disclosure in that force from the sprocket on the oncoming film is extended to the film off going from the sprocket to assure steady film movement past a sound device adjacent to the sprocket. As illustrated in Fig. 51, the means for extending this force include the belt and supplemental guide rolls and a pulley. Other expedients assist in the arrangement, such as the tensioning roll 114.

The sprocket's construction with a cylindrical transparent zone for passage of light outwardly to a sound record on the film provides conditions for a stylus formed record to modify the light for sound reproduction. Here the sprocket not only provides propulsion to the film, it coordinates light, light modulating record, and light receptive agencies for synchronous sound reproduction for direction of the recording of pictures on the film.

While the figures illustrating the sound recording and reproducing facilities place these instrumentalities at separate locations, it is well known to the art that the stylus recording heads may be converted to reproducer heads by switching electrical connections thereto. Such action is contemplated particularly where the picture and sound recording are made one after the other, though the switching mechanism is not shown.

As an example of a known engraving medium suitable for hill and dale recording mention is made of a fine skin of black mercuric chloride applied to the gelatine layer on the film base. This is particularly useful for sound reproduction by a light activated system as illustrated in Figs. 1 and 48.

The alteration of the recording material by magnetic means involves a time factor. This factor has been determined by the time of travel of the recording material past the recording head. The longer a given segment of recording material can be subjected to the magnetizing influence assigned to that segment, the theory is that, the stronger will that influence be impressed upon that segment. This stronger remanent effect in the segment will more efficiently act upon the reproducing head later. Among the alternative modes of operation available for the mechanism of this invention, reference is made to that for recording sound on the unexposed film and from a previous magnetic sound recording and then recording the pictures. It is first necessary to provide the modulated currents for recording to the leads 127 and 128 leading to the recording head 117, as shown in Fig. 1 for reception from the television receiver. The television sound receiver is regarded as only one of several means for providing "modulated currents" for recording. A magnetic sound reproducer adapted to varying rates of operation is adapted to provide the modulated currents required from the magnetic record by connecting the reproducer circuit to the leads mentioned.

Assuming the film rate to be 24 frames per second and the footage rate of the magnetic record 18 inches per second, which is the standard for 35 mm. film practice, the film and magnetic record have the same lineal movement per second and if they are united they will have automatic synchronization of movement. Assuming that magnetic recording medium 453 of Fig. 52 is wide enough for a double sound recording, and that the first recording has been recorded by head 117 by a first run through the combination as a recorder only, and that the film has been rewound to the supply magazine, and that the recording head has been shifted to the second track of the magnetic material with the reproducing head placed on the record track with the reproducer coil connected to leads 127, 128 and with member 129 inactive, then the apparatus is in a position to record with a remanence acquired after the fashion before stated. By operating the camera at 6 frames per second only as a sound mechanism, the given segment of recording material will be subjected to the magnetizing influence assigned to that segment four times as long as the time for the first recording. Rewinding the film to the supply magazine, the erasing head may be applied to erase the first record, or the latter may be allowed to remain to provide an echo effect. The third run of the film may then be made to record the pictures, utilizing the sound record to give aural guidance for action in the field of the camera.

The theory of magnetic recording is that a magnetic field brought to bear upon a material capable of being magnetized, such as an alloy 80 percent cobalt and 20 percent nickel, will rearrange the internal structure submicroscopically. If the magnetic field is modulated to represent the changes in frequency of sound the varying magnetic field will variably magnetize the material and provide a record in the material, provided the material has a uniform movement within a suitable speed range. A magnetizable material as above having a plated coating thickness of 0.0003 inch has proved satisfactory. The remanent magnetization in the medium has transfer characteristic which to be utilized must be uniform through the medium section. The conditions of magnetization of the medium should be uniform, that is the magnetizing force should be applied from a definite position relative to the medium, preferably the magnetizing agency should be continuously in contact with the medium and the tension on the medium should be uniform so as not to unduly stretch and vary the transfer characteristic. To meet the foregoing theoretical conditions this invention has provided new disposition of various agencies.

The theory of sound reproduction from the magnetic recording is that movement of the recording medium with its varied remanent magnetization through the field of an electromagnetic coil will provide variations in the circuit proportional to the varied record in the medium. The agency by which this is done is in accord with the agency by which the record was made. Preferably the reproducing agency should be continuously in contact with the medium. The tension and rate of movement of the medium in recording and reproduction preferably should be the same. It is a problem to provide means to keep them the same and which problem is solved in the present camera sound combination.

The sound recording operations herein disclosed utilize change in position of the recording medium, change in an electric circuit having electric variations proportional to sound frequencies to be recorded and applies the power of the circuit at any instant to affect the recording medium in degree proportional to the current or voltage at the instant. Thus successive increments of time provide successive increments of distance along the recording medium with a record at each increment representing change in the power circuit if there be change. The system is reversible for sound reproduction. The sound recording and reproducing operations as outlined prefer contact between recording medium and associated agencies having the electric circuit to eliminate variations in recording. This contact requirement necessitates resilient mountings for the circuit agencies to compensate for variations in the thickness of the recording medium as it passes around the sprocket and over the supporting shoe. The increments of distance along the recording medium are provided only by the sprocket.

In the recording mediums herein employed, the theory is that the material thereof is physically displaced to provide the record. In the magnetizing operation the displacement is submicroscopic interiorly of the body and is not subject to direct visual observation. In the inscribing operation the displacement is exteriorly of the medium and directly observable.

The sound recording and reproducing stations beside having means to give longitudinal movement to the film, have members 117 and 118 in one case and members 441 and 442 in another case carrrying portions of electric circuits (not shown) adapted to provide electromagnetic fields. The fields of members 117 and 118 normally overlap and take in the moving film. A guard 126 separates the fields thereby permitting their assembly close together around the sprocket 85. This close assembly admits the use of a common backing of the sprocket to the members and thereby eliminates the vibrations in the film at the point of sound reproduction, vibrations incident to separation from the sprocket teeth.

Referring to Fig. 51 and to the film base folded to include the emulsion, the flexibility of the portion of the base joining the folded parts is a property due in part to the nature of the material and in part to the thinness of the section. It affects in the present case the transfer characteristic of the combined base and recording material in so far as the operations of magnetic and inscribing sound recording and sound reproducing are involved. In the handling of the base and recording material through the apparatus, variations of stress occur in the combination longitudinally and crosswise that have to be kept low enough to prevent disturbance of the base and recording material. Such stresses beget changes in the transfer characteristic of the material for both recording and reproducing sound and incidentally in the emulsion particularly where the base is less than the usual 0.005 inch in thickness. With the base folded the emulsion is along the neutral axis where bending stress is theoretically zero. As the film goes on to sprocket 85 in the standard manner it is relatively free from tensile stress. If it is borne by member 115 it is further freed from such stress. By the placement of the recording agency at the mid point of the arc of film over the sprocket, the sprocket teeth are enabled to hold the stress of take-up pull from traveling back to the recording area, particularly with standard film. With the folded film and the member 115, such stress does not get back much past agency 90 if at all. With the member 115 prestressed for operation in and out of the case between the magazine and the sprocket and the film borne on member 115, the latter is enabled to take practically all tension involved in the film transport. In this event the thickness of the folded film may be lowered considerably below the standard 0.005 inch and may thus acquire increased flexibility and promote the handling mentioned in connection with Fig. 52. Operating the film shown in Fig. 52 over the sprocket for recording assures a minimum of the noted transfer disturbance. Operating the said film over shoe 438 and borne on member 115, continues this assurance of freedom from stress.

Referring to Figs. 51 and 52, a composite film is shown comprising a longitudinal strip of material such as cellophane for example, folded along its longitudinal axis as at 448 and having its adjacent folded edges 449 held together as by Scotch tape type of adhesive permitting subsequent separation. Outer surface 450 carries an adhesive of the Scotch tape type such as is adapted to separation from conveyor 115. Inner surface 451 is coated with a photographic emulsion. Inner surface 452 is coated with developer and fixer. After exposure it is only necessary to introduce moisture between the surfaces to effect quick development. The emulsion within the envelope is only slightly adhesive and is readily removed if such action is desired, making the envelope again available for use. On the outside of the envelope adjacent to the emulsion 451 is a strip of material 453 adapted to sound recording. If the recording is by stylus the strip is in the nature of a wax or resin coating adapted to engraving. If the recording is by magnetic means, the strip is of material accepting alteration by magnetic means and suitable to the requirements for permanent record. The strip of material 453 after recording may as a result of the stylus recording thereon be divided into two strips, the stylus operating as nearly to the center of the strip as possible. The adjacent strips of magnetic material may each carry its own magnetic record and the adjacent edges may carry indentations which together form a mechanical sound record. A preferred adhesive for holding the magnetic material is gelatin. The thickness of emulsion is determined by transparent particles 451′ embedded in the emulsion which act as separators when the two surfaces of the envelope are pressed together, particles of hardened emulsion.

Referring to Fig. 51, roll 88 of stainless steel or other non-magnetic material is shown supporting belt 115 in operating position with erasing head 116′, recording head 117′ and reproducing head 118′. These heads preferably are of two pole construction adapted to operate on the magnetic material as dipole units, the magnetic material being in a flexible layer 115′ attached to the belt as by pliable plastic. Suitable spacing of magnetized areas along the belt is in agreement with the spacing of picture areas on the film. A coil 334′, substituting for member 334, with terminals 285′ will provide surges in the coil intermittently under operation of the belt by the pull down mechanism. Cessation of this surge signals the television tube release from blanking by the agencies previously discussed.

Referring to Fig. 52, the space between the adhesive 450 and carrier on the belt side thereof may carry a layer 450′ of magnetic iron oxide or the like of approximately one half thousandth inch thickness. This magnetic layer may be subjected to dipole recording, cooperative action with coils for pulse generation, and erasing means in lands thereon as previously detailed for like media. This layer may be stripped from the carrier to remove the opaqueness detrimental to printing and subsequent projecting operations.

Referring to Fig. 53, showing a vertical section through a film 455 and a blanking screen 456, the strip openings 457 are in width one-half the closed spaces 458 and are in length the width of the film. The blanking screen 456 may replace color screens 382 in frame 374 of Fig. 43. In such position the screen is shifted to three positions per photographic frame by the cam of Fig. 45, when suitably positioned on shaft 203. With such a positioning, red, blue and green filters are positioned on shutter disk 168 which rotates once before the screen 456 while the screen occupies the three positions before the film 455. The color filters are so positioned that the shift from one color to another occurs as the screen 456 shifts from position to position. By this arrangement the light through the colored filters affects the film in red, blue and green sequence over the whole film frame, and provides a three color analysis of the exposure light on a single frame. By this arrangement color fringing is avoided. The sequence of color is the same in all frames, hence marking of the film for color identification is unnecessary. After development and conversion to a positive, the film may be projected through screen 382 in frame 374 with the frame being immobilized by removal of operating shoe 364.

The term light used in this application is intended to include those electromagnetic waves which are visible and invisible, capable of affecting a photographic emulsion, and some of being absorbed by a moving shutter.

The foregoing illustrations and descriptions of apparatus and film provide a pattern by which the images appearing on the screen of a cathode ray tube of a television receiver may be recorded and projected in black and white or color.

While the film shown in Fig. 52 is provided for amateur use, lenticular film is also intended to be used for professional work in accordance with principles and examples set forth in History of Color Photography, Joseph S. Friedman, 1945, pages 214–272 inclusive. Particular reference is made to U.S. Patent 2,203,651 wherein are provided a lens system and a color screen suited to use with lenticular film. These are shown incorporated in the present invention in Fig. 38.

Referring to Figs. 20, 21, 22, 23, 26 and 27, it is seen that the shutter construction lends itself to manipulation thereof whereby the lens systems suitable for lenticular film is accommodated. Arcuate member 175 is moved radially thereby removing tongued member 176 from the slotted extension 165″ of disk 165. This allows axial movement of members 177 and 165′ and thus their withdrawal.

The various mechanical arrangements presented and their description are by way of illustration only and it will be understood that other mechanical arrangements and devices may be employed to effect the modes of operation and the results described. Other arrangements, modifications and variations will occur to those skilled in the art to which the invention is related. Accordingly, my invention should be understood as not restricted to the specific embodiments illustrated and described but as including all embodiments coming within the scope of the following claims.

I claim:

1. In combination, a closed television system including a cathode-ray tube providing successive images to be photographed, a motion picture camera with an objective to photograph said images on film and having means including an intermittent film moving mechanism to move said film horizontally past the objective to provide a record frame of length greater than the width of film, means to feed the film into and out of the camera and to carry same in its horizontal interval travel path, means to blank said tube, means including an operating connection between said blanking means and said camera synchronizing blanking with film moving, a background screen, a background screen projector, a switch operatively connected to the projector for controlling the light interval of the latter, and means including an operating connection between said camera and said projector whereby blanking of said tube, film moving and switching off said projector light are properly synchronized.

2. A combination in accordance with claim 1 in which said means to feed the film horizontally into and out of the camera includes a belt to carry the film.

3. A combination in accordance with claim 1 in which said means to move the film past the objective includes a belt to relieve stress on the film.

4. A combination in accordance with claim 1 in which said means to feed the film into and out of the camera includes a belt to support the film and means to effect pressure adhesion temporarily between said belt and film whereby the lower edge of the film in its horizontal travel in the camera is lifted from sliding frictional engagement with guide means.

5. In combination, a closed television system including a cathode-ray tube providing successive images to be photographed, a motion picture camera with an objective to photograph said images on film and having means including an intermittent film moving mechanism to move said film horizontally past the objective to provide a record frame of length greater than the width of film, means to feed film into and out of the camera including a sprocket drum, means including said drum to record on the film sound accompanying said images, means to blank said tube, means including an operating connection between said blanking means and said camera synchronizing blanking with film moving, a background screen, a background screen projector for projecting images intermittently on said screen, a switch operatively connected to the projector for controlling the projecting interval of the latter, and an operating connection between said camera and said projector whereby blanking of said tube, film moving and switching off of said projector light are synchronized.

6. A combination in accordance with claim 5 wherein said sound recording means includes means to inscribe the film.

7. A combination in accordance with claim 5 wherein said sound recording means includes means to magnetically affect material on said film.

8. A combination in accordance with claim 5 with means for reproducing from said sound record to monitor said record as it is being made.

9. In a system for recording on motion picture film composite images where the images are made up of background scenes projected intermittently upon a screen and where foreground action occurs before the screen and where the background and foreground images are combined as the action occurs and where there is a background screen and a background projector projecting images intermittently on said screen; a cathode ray tube and means operatively connected thereto for translating said images jointly and for operating said tube to show said images, a camera for photographing said tube displayed images, and means including an operating connection from said camera to said projector for synchronizing the appearance of said background image with the operation of said translating means, and means for providing duration of said projection images acceptable to said translating means.

10. In a system for recording on motion picture film composite images where the images are made up of background scenes projected intermittently upon a screen and where foreground action occurs before the screen and where the background and foreground images are combined as the action occurs and where there is a back ground screen and a background projector projecting images intermittently on said screen, the combination of a cathode ray tube and means operatively connected thereto including a television camera for translating said images jointly and operating said tube to show said images, a camera for photographing said tube displayed images, means including an operating connection from said camera to said projector for synchronizing the frequency of appearance of said background image with the operation of said translating camera, and means for regulating the duration of said projection image to meet the operating requirements of said television camera.

11. A recording system for recording televised composite panoramic images showing projected background and live action foreground including a cathode ray tube, means movably mounted for causing operation of said tube and appearance thereon of said images in an aspect ratio compressed in the horizontal dimension, including a camera for photographing said images, a screen for displaying said background images in the field of view of said causing means, a projector for showing said background image intermittently and means including an electronic operating connection between said camera and said projector for timing the operation of the latter in synchronization with said camera so that said background images and foreground images appear simultaneously upon said cathode ray tube while the film in said camera is stationary for recording, said operating connection accommodating movement of said movably mounted members.

12. In combination with a background screen means for projecting a background intermittently on the screen, an electronic switch operatively connected to the projector for controlling the light interval of said projector, means including a closed television system for producing images from said screen on a cathode ray tube of the system, a film recording camera including images from said tube in its field of view, means including an electronic switch operatively connected to said camera for blanking said tube during the pull down interval of said camera and means including an operating connection between said camera and said projector for synchronizing the pull down periods of said projector and camera and the blanking periods of said projector and said tube.

13. In combination with a background screen of relatively wide aspect ratio means for projecting a background intermittently on said screen, an electronic switch operatively connected to the projector for controlling the light interval of said projector, means including a closed television system for producing images from said screen on a cathode ray tube of the system, said system including an optical system adapted to compress the horizontal dimension of the image of said screen so that the aspect ratio on the tube more nearly conforms to the aspect ratio of standard motion pictures which is approximately 1.33 to 1, a film recording camera including images from said tube in its field of view, means including an electronic switch operatively connected to said camera for blanking said tube during the pull down interval of said camera, and means including an operating connection between said camera and said projector for synchronizing the pull down periods of said projector and camera and the blanking periods of said projector and said tube.

14. The combination set forth in claim 13 wherein means are provided for supporting said film camera in a horizontal position and the film in said camera is operated horizontally so that the long dimension of the image on the tube is cast longitudinally of the film and the camera is positioned relative to the tube image so that the image on the film practically fills the space between the sprocket holes thereby providing a maximum of information on the available film space in a reduced aspect ratio.

15. In combination with a background screen means for projecting a background intermittently on the screen, a switch operatively connected to the projector for controlling the light interval of said projector, means including a closed television system for providing images from said screen on a cathode ray tube of the system, a film recording camera including images from said tube in its field of view, means including a switch operatively connected with said camera for blanking said tube during the pull down interval of said camera, and means including an operating connection between said camera and said projector for synchronizing the pull down periods of said projector and camera and the blanking periods of said projector and said tube.

16. In combination with a background screen a background projector for the screen, a switch operatively connected to the projector for controlling the light interval of said projector, a closed television system showing images from the screen on a cathode ray tube of the system, a film recording camera with a shutter adapted to cut off the light from said tube during the film moving interval of said camera, and means including an electronic operating connection between said camera and said projector for synchronizing the pull down periods of said projector and said camera and the blanking of said projector.

References Cited in the file of this patent

UNITED STATES PATENTS

| | | |
|---|---|---|
| 1,957,525 | Brown et al. | May 8, 1934 |
| 2,073,370 | Goldsmith | Mar. 9, 1937 |
| 2,204,864 | Michaelsen | June 18, 1940 |
| 2,221,873 | Knoefel | Nov. 19, 1940 |
| 2,227,592 | Vezzi | Jan. 7, 1941 |
| 2,270,198 | Schensted | Jan. 13, 1942 |
| 2,322,037 | Lindquist | June 15, 1943 |
| 2,362,818 | Herzkas | Nov. 14, 1944 |
| 2,364,363 | Howell | Dec. 5, 1944 |
| 2,499,181 | Downes et al. | Feb. 28, 1950 |
| 2,525,558 | Mihalyi | Oct. 10, 1950 |
| 2,589,014 | McLeod | Mar. 11, 1952 |
| 2,594,715 | Angel | Apr. 29, 1952 |
| 2,600,868 | Hales | June 17, 1952 |
| 2,607,845 | Clark | Aug. 19, 1952 |
| 2,608,126 | Ostreicher | Aug. 26, 1952 |
| 2,612,554 | Anderson | Sept. 30, 1952 |
| 2,629,861 | Begun | Feb. 24, 1953 |
| 2,650,484 | Bujak | Sept. 1, 1953 |
| 2,654,080 | Browne | Sept. 29, 1953 |
| 2,654,300 | Baker | Oct. 6, 1953 |
| 2,660,103 | Culp | Nov. 24, 1953 |
| 2,664,465 | Gillette | Dec. 29, 1953 |
| 2,673,485 | Roderick | Mar. 30, 1954 |
| 2,677,012 | Bach | Apr. 27, 1954 |
| 2,677,256 | Donandt | May 4, 1954 |
| 2,679,187 | Bitting | May 25, 1954 |
| 2,682,817 | Gross | July 6, 1954 |